(12) United States Patent
Kelley

(10) Patent No.: US 8,274,009 B2
(45) Date of Patent: Sep. 25, 2012

(54) AUTOMOTIVE BODY SHOP FLEXIBLE FRAMING GATE CHANGING SYSTEM

(75) Inventor: Reginald D. Kelley, Utica, MI (US)

(73) Assignee: Easom Automation Systems, Inc., Madison Heights, MI (US)

( * ) Notice: Subject to any disclaimer, the term of this patent is extended or adjusted under 35 U.S.C. 154(b) by 273 days.

(21) Appl. No.: 12/804,071

(22) Filed: Jul. 13, 2010

(65) Prior Publication Data

US 2011/0011918 A1 Jan. 20, 2011

Related U.S. Application Data

(60) Provisional application No. 61/270,858, filed on Jul. 14, 2009.

(51) Int. Cl.
*B23K 9/12* (2006.01)
*B23K 11/00* (2006.01)

(52) U.S. Cl. .................. 219/79; 219/80; 901/42

(58) Field of Classification Search .............. 219/79, 219/80; 901/42
See application file for complete search history.

(56) References Cited

U.S. PATENT DOCUMENTS

| | | | |
|---|---|---|---|
| 5,143,270 A | 9/1992 | Hamada et al. | |
| 5,184,766 A | 2/1993 | Takahashi et al. | |
| 5,560,535 A | 10/1996 | Miller et al. | |
| 5,902,496 A | 5/1999 | Alborante | |
| 6,173,881 B1 | 1/2001 | Sloan et al. | |
| 6,223,611 B1 | 5/2001 | Kelley | |
| 6,344,629 B1 | 2/2002 | Kato et al. | |
| 6,364,817 B1 | 4/2002 | McNamara et al. | |
| 2003/0037432 A1* | 2/2003 | McNamara | 29/771 |
| 2008/0189939 A1* | 8/2008 | Kraus et al. | 29/824 |
| 2008/0295335 A1* | 12/2008 | Kilibarda et al. | 29/897.2 |

* cited by examiner

*Primary Examiner* — David Zarneke

(74) *Attorney, Agent, or Firm* — Jacox, Meckstroth & Jenkins

(57) ABSTRACT

An automotive body framing system includes a setter supported by parallel spaced tracks for movement from a work position to a standby position and to a gate change position and driven by corresponding racks and synchronized pinion drive units. Opposing gate storage belt shuttles are located at the gate change position for receiving the setter therebetween, and a gate staging cart is supported in back of the setter by parallel tracks and is also moved between opposing gate storage belt shuttles by synchronized rack and pinion drive units. Power operated registration units are positioned on the setter to register each gate received at precise horizontal and vertical positions, and the setter, staging cart and gate storage belt shuttles each have a series of resilient guide and support rollers to provide for quiet operation during rapid transfer of the gates on the setter, staging cart and belt shuttles.

20 Claims, 23 Drawing Sheets

AUTOMOTIVE BODY SHOP FLEXIBLE FRAMING GATE CHANGING SYSTEM

RELATED APPLICATION

This application claims priority of provisional patent application Ser. No. 61/270,858, filed Jul. 14, 2009.

BACKGROUND OF THE INVENTION

This invention relates to automotive body framing systems, for example, of the general type disclosed in U.S. Pat. No. 5,143,270, U.S. Pat. No. 5,184,766, U.S. Pat. No. 5,560,535, U.S. Pat. No. 5,902,496, U.S. Pat. No. 6,173,881, U.S. Pat. No. 6,344,629 and U.S. Pat. No. 6,364,817, the disclosures of which are herein incorporated by reference. Such a framing gate changing system is used in the final assembly welding area of an automotive assembly line body shop to store and retrieve multiple body framing tools, commonly referred to as "gates", so that multiple models or designs of vehicles bodies can be formed or framed on the same assembly line at a framing buck or framing station. At the framing station, major sheet metal body sub-assemblies are brought together and attached to each other by robotic welders to form a fully assembled body or framed assembly.

The sub-assemblies include a floor panel, body sides, cowl panel, header panels and other components which are positioned by devices such as clamping fixtures supported by the gates. As the framing process is performed at the framing station, the body geometry or fit of the major sub-assemblies is set by resistance welding the outer edge portions of the sub-assemblies to each other. Additional welds are commonly added downstream after the framing station to strengthen the connections further between the sub-assemblies. The additional welding process is commonly referred to as "re-spot", but the process does not alter the body geometry established by the framer at the framing station.

SUMMARY OF THE INVENTION

A gate changing system constructed in accordance with the invention includes a set of three basic modules on each side of the framing line or station, and the modules include a setter, a gate staging cart and hi-speed gate storage belt shuttles. The setter receives and positions a selected gate and moves to one of three different positions perpendicular to the flow of car body components progressing on the framing line. When the setter is in the full forward work position supporting a gate, the gate is positioned vertically and longitudinally and is pulled back against the setter frame to position the gate in registration.

After the welding operations are completed on a car body at the framing station, the setter is retracted to a standby position on a set of tracks by rack and pinion drive units, waiting for the arrival the next body components and providing space to the side of the setter for robot welders to perform respotting operation. However, if the next body components are not the same as the previous components and require a different gate, the setter is retracted further beyond the standby position to a gate changing position between a set of opposing hi-speed gate storage belt shuttles. The gate on the setter is quickly removed by one belt shuttle, and a new gate is simultaneously transferred to the setter by the opposing shuttle for rapid return to the framing station by the rack and pinion drive units.

If three or more gates are required for framing different car bodies, the gate changing system of the invention incorporates a gate staging cart which is supported by tracks behind the setter for linear movement also by rack and pinion drive units for receiving and transferring gates between the two opposing gate storage belt shuttles or between additional sets of opposing gate storage belt shuttles for rapidly exchanging three, four or more gates between the setter and the opposing sets of gate storage belt shuttles. The general modular construction of the gate changing system of the invention provides for handling up to six gates with hi-speed gate exchange while also providing space on opposite sides of the work station for performing respot welding operations. The setter, gate storage belt shuttles and gate staging cart also incorporate resilient gate support rollers for providing quiet operation during the gate transfer and exchange operations.

Other features and advantages of the invention will be apparent from the following description, the accompanying drawings and the appended claims.

CONSTRUCTION AND OPERATION OF THE ILLUSTRATED FRAMING SYSTEM

Figure 1:
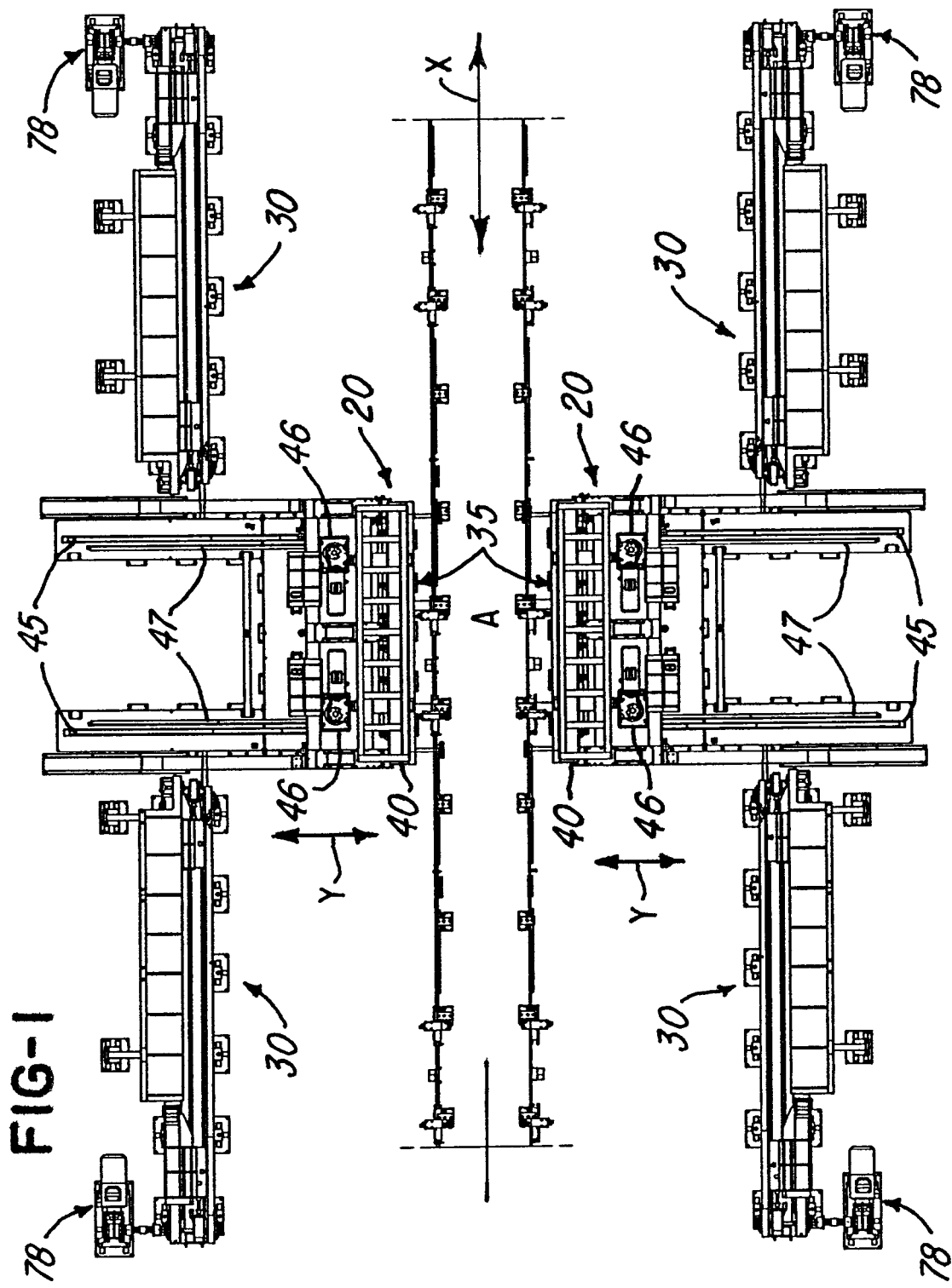
FIG. 1 is a plan view of a two gate arrangement on each side of a car body framing line with each arrangement including a setter, its support base and two opposing gate storage belt shuttles.
Figure 2:
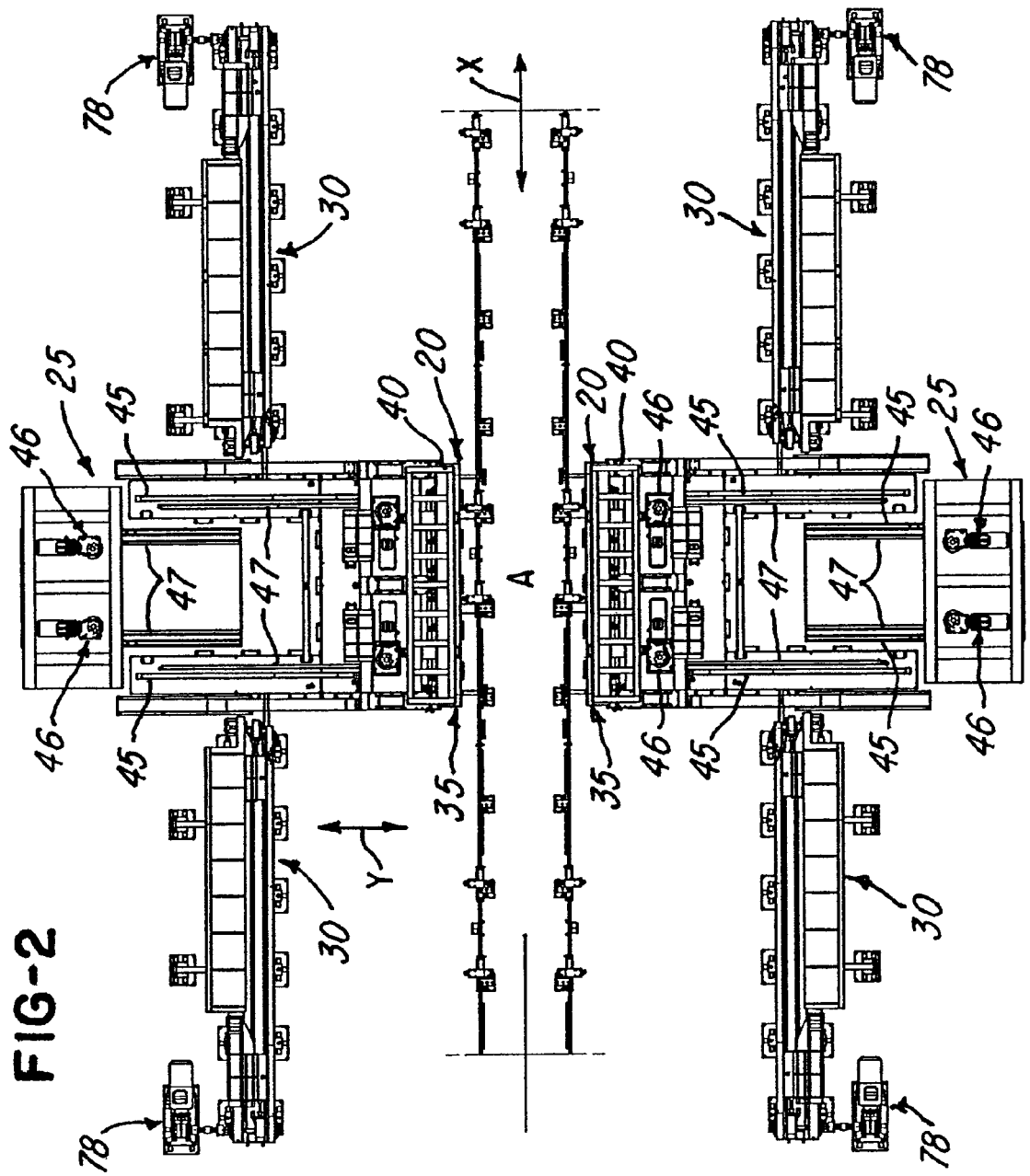
FIG. 2 is a plan view of a three gate arrangement similar to FIG. 1 and including the addition of a staging cart and its support base on each side of the body framing line.
Figure 3:
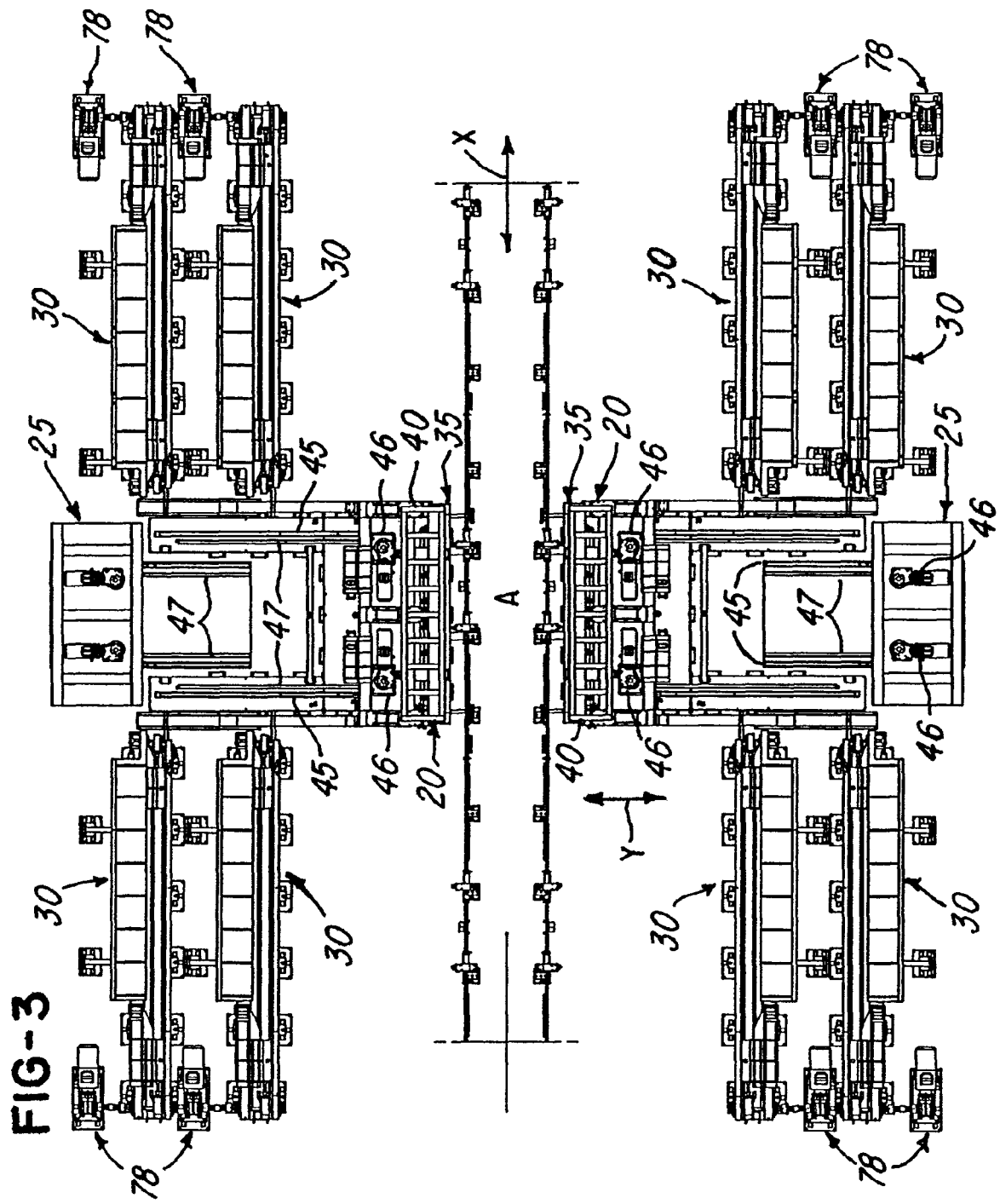
FIG. 3 is a plan view of a four gate arrangement similar to FIG. 2 and including two additional opposing gate storage belt shuttles on each side of the body framing line.
Figure 4:
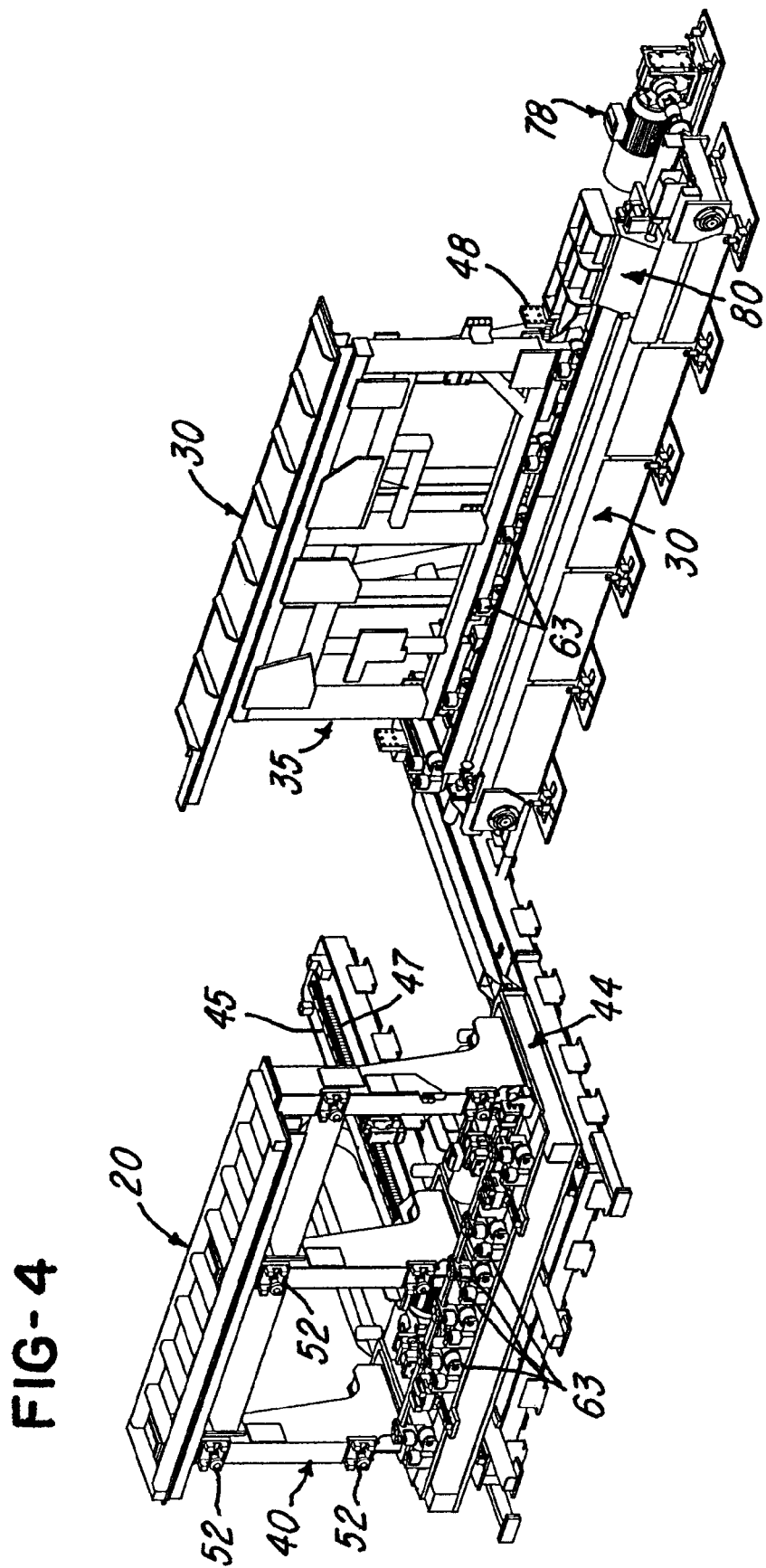
FIG. 4 is a perspective view of a setter, a setter support base and a gate storage belt shuttle with the setter in a work or framing position.

As mentioned above, a flexible gate changing system constructed in accordance with the invention is made up of three basic modules. A group or set of modules are used at a framing station on each side of a body framing line or area A (FIGS. 1-3). The modules include a setter 20, a gate staging cart 25 (FIGS. 2 & 3) and at least two opposing high speed gate storage belt shuttles 30. The setter 20 holds a registered selected gate 35 which usually includes fixtures, locators and clamps supported by the gate. The setter 20 moves on demand to one of three preset positions on a Y axis (FIG. 1) perpendicular to the flow of body components on an X axis through the framing line area A. Since the modules are the same on each side of the framing station or area A, the modules on only one side will be described. The full forward position (FIGS. 1-4) of a framing gate 35 is when the gate supporting fixtures, etc. contact the unframed body sub-assemblies (not shown) and locate them into an accurate and repeatable position at the framing station A.

Figure 16:
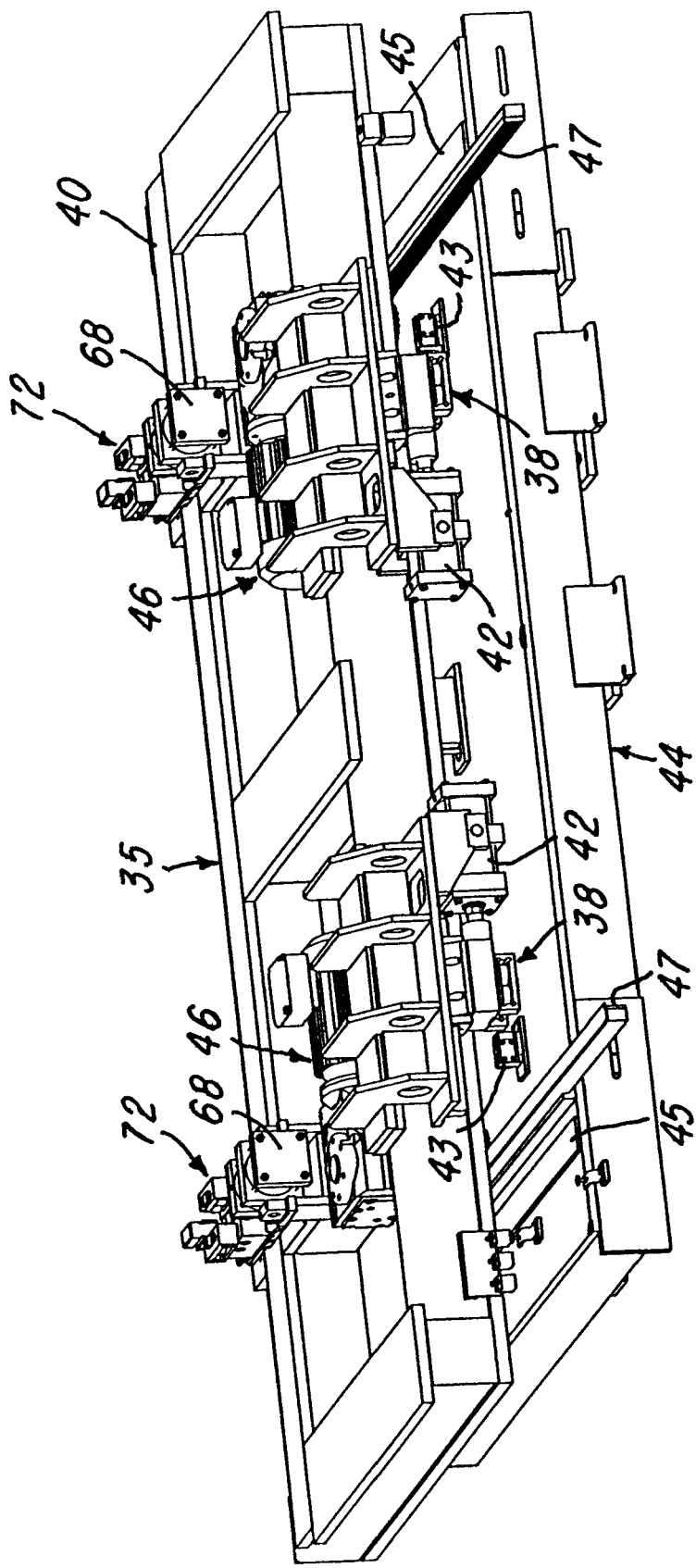
FIG. 16 is a perspective view of the support base assembly for the setter on each side of the car body framing line.
Figure 17:
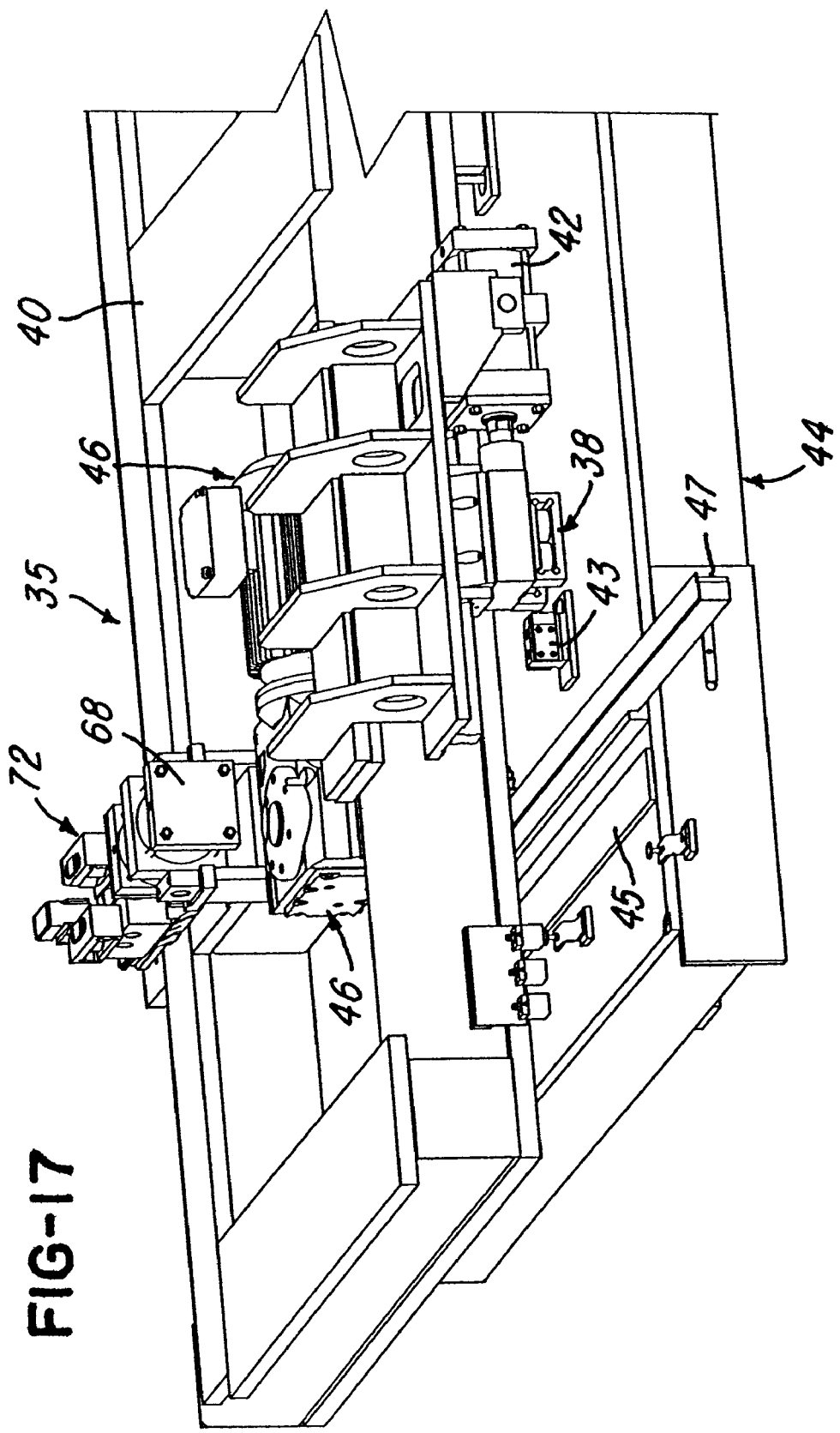
FIG. 17 is an enlarged fragmentary perspective view of a portion of the base assembly shown in FIG. 16.
Figure 18:
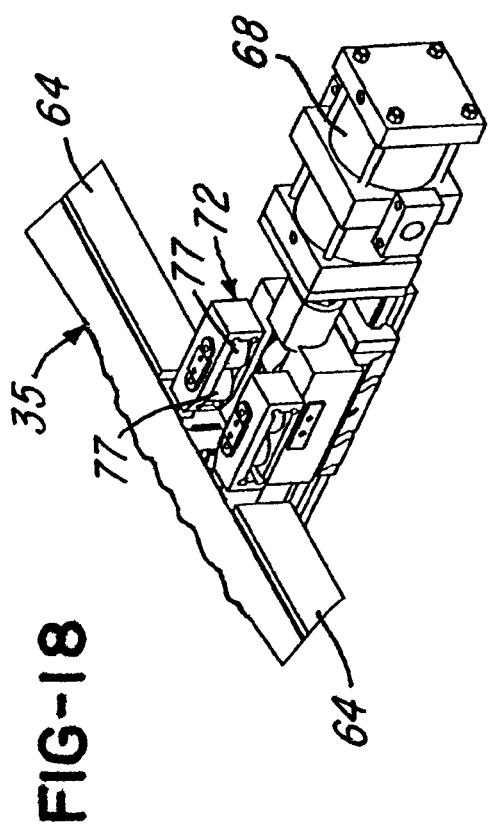
FIG. 18 is a perspective view of a fluid cylinder actuated system on the setter for registering a framing gate shown in fragment.
Figure 20:
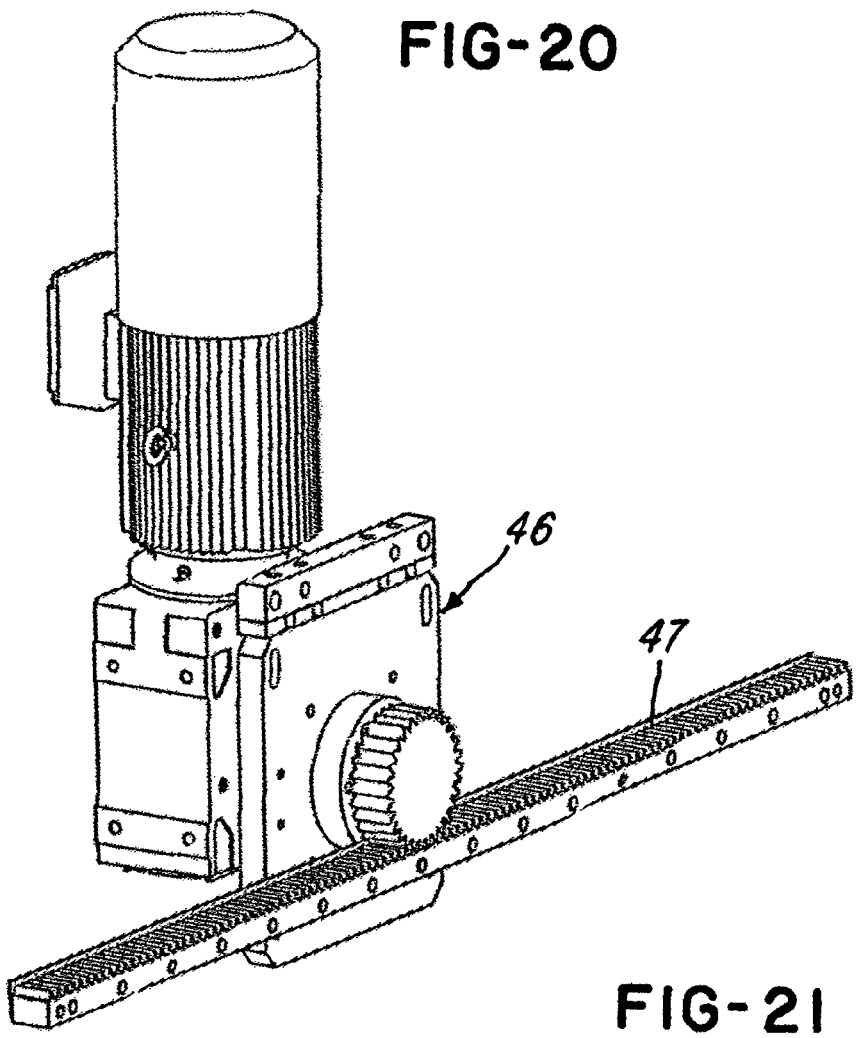
FIG. 20 is a perspective view of a motor/gearbox drive for a pinion engaging a horizontal rack to move the setter perpendicular to the car body framing line to three different positions of the setter.

In order to assure a precise "cross car" location on the Y axis of the setter 35 at the full forward position, a pair of horizontal slide supported roller clusters 38 (FIGS. 16 & 17) are mounted on the lower back side of the setter frame 40 and are actuated by corresponding fluid or air cylinders 42 to engage a pair of fixed blocks or locators 43 mounted on a setter base support frame 44 at the forward position. The setter frame 40 is supported for movement on the Y axis by parallel space linear tracks or rails 45 (FIGS. 1-3) and is moved on the rails 45 by two synchronized rack and pinion servo drive units 46 (FIG. 20) which engage linear racks 47 parallel to the rails 45.

Various locator pins, blocks, clamps and other fixtures (not shown) are mounted on the vertical gate 35 and are used to force the loose car body panels into locations such that the panels are ready to be welded or framed into relationship with each other. Resistance welding robots (not shown) are located at floor level on opposite sides of the setter 20 in its forward position and may be mounted on a balcony structure above the framing station in the area A to perform spot welding along adjacent edge portions of the panels to lock them into a framed location with respect to each other.

Figure 5:
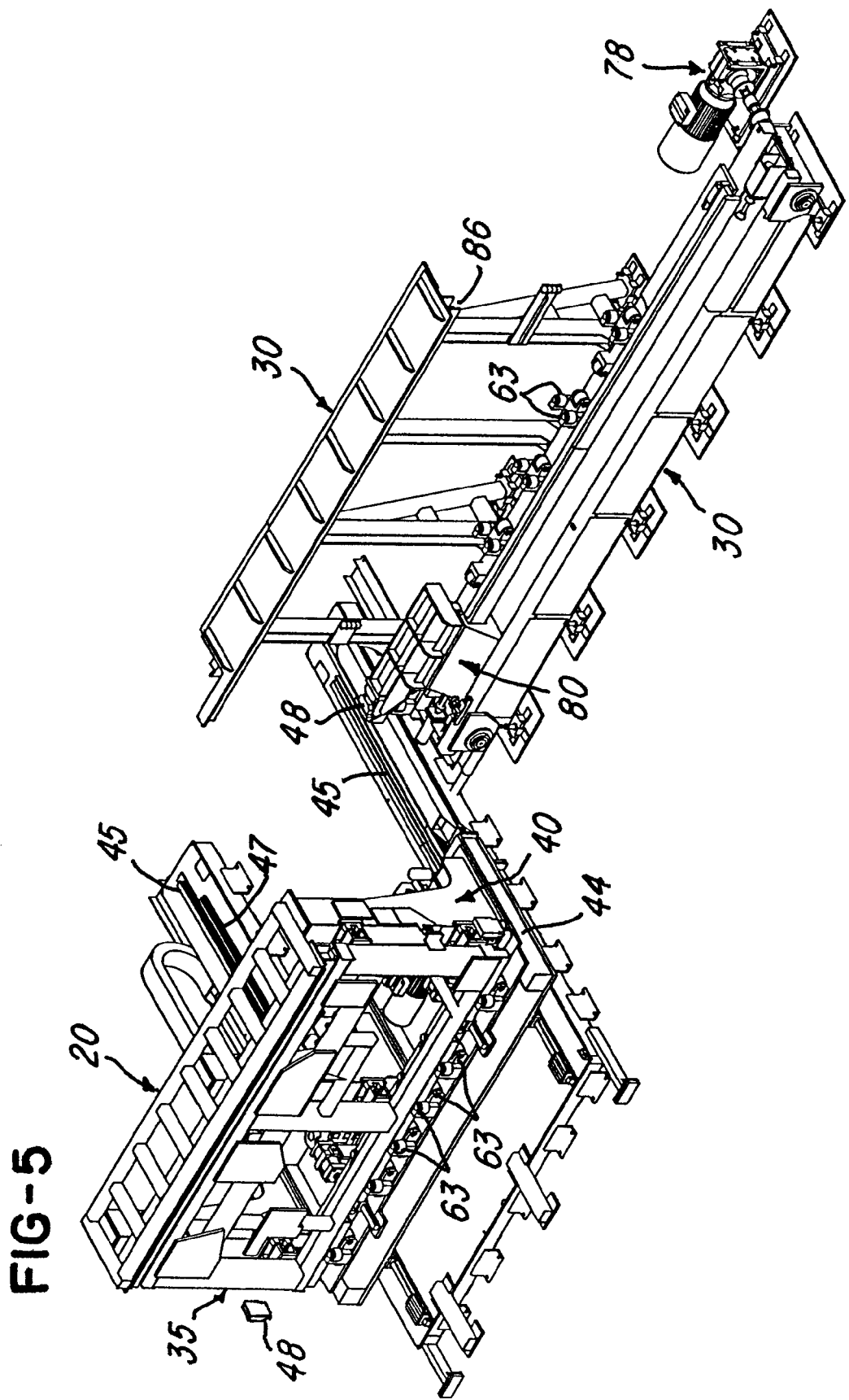
FIG. 5 is a perspective view similar to FIG. 4 with the setter retracted to a standby position.

After the framing welding is complete, the robots retract their weld guns away from the framed body, and the various clamps on the gate 35 release the framed body. The setter locator roller clusters 38 (FIG. 16) are disengaged from the locators 43 by the cylinders 42, and the setter 20 then retracts the gate 35 away from the framed body a distance great enough to allow the framed body to be transferred down the assembly line through the framing area A. The retraction is about 800 mm to a standby position (FIG. 5). If the same style body is next along the assembly line, the setter 20 waits until the next car body sub-assemblies are in location at the framing station, and the process steps are repeated.

If a different style body is next in the line, the framing gate 35 must be changed to match the next style body. To change the framing gate, the setter 20 moves or retracts by the drive units 46 further away on extensions of the tracks 45 from the framing area to a gate change location or position (FIG. 6) which is about 2,900 mm further from the standby position. When the setter 20 moves to the gate change position, it is aligned with and positioned between two laterally aligned and opposing high speed gate storage belt shuttles 30. These shuttles are used to store other style gates 35 that are required to frame other style vehicle bodies being manufactured on the line.

Figure 6:
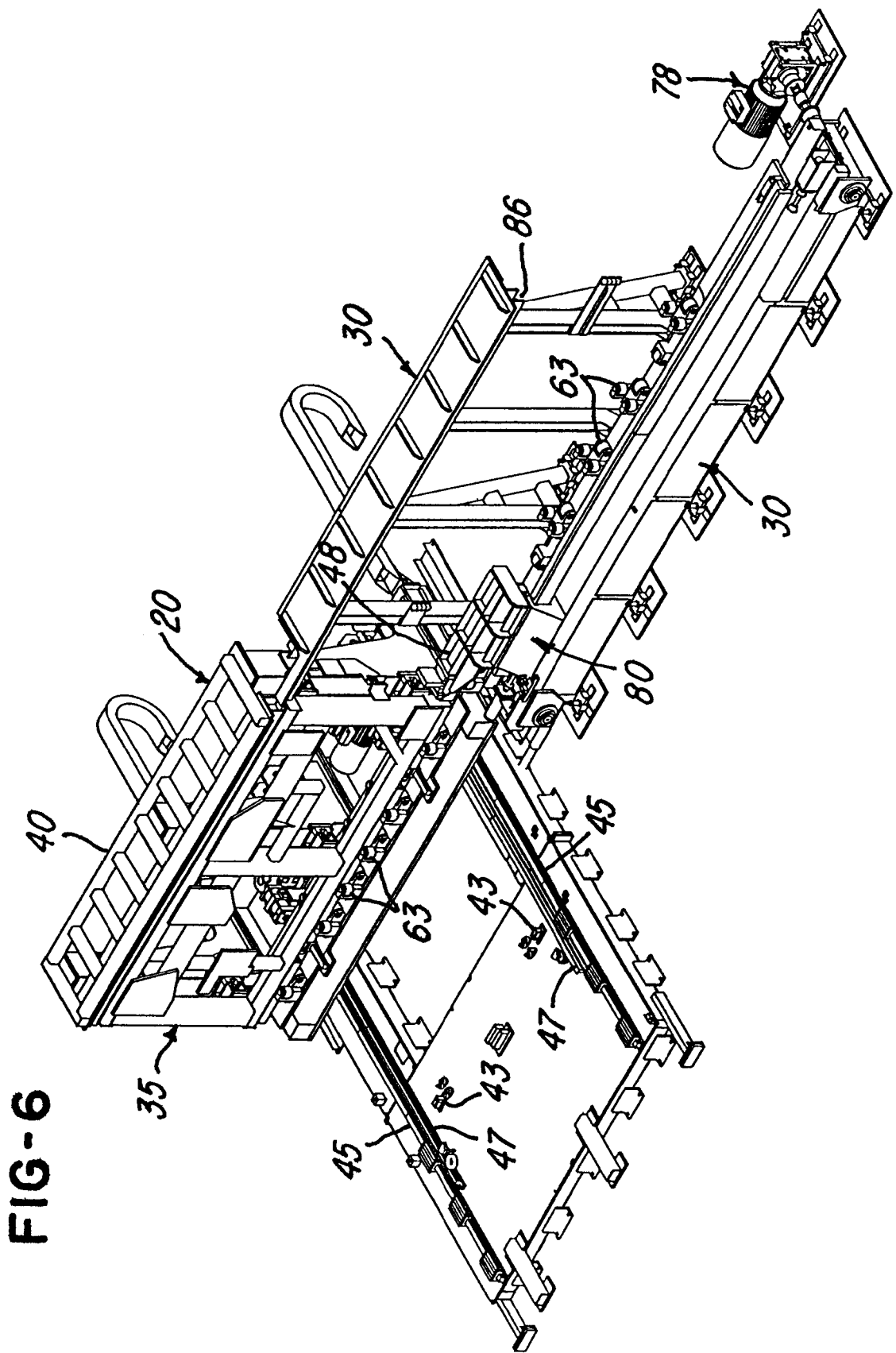
FIG. 6 is a perspective view similar to FIG. 5 with the setter retracted further to a gate change position.
Figure 15:
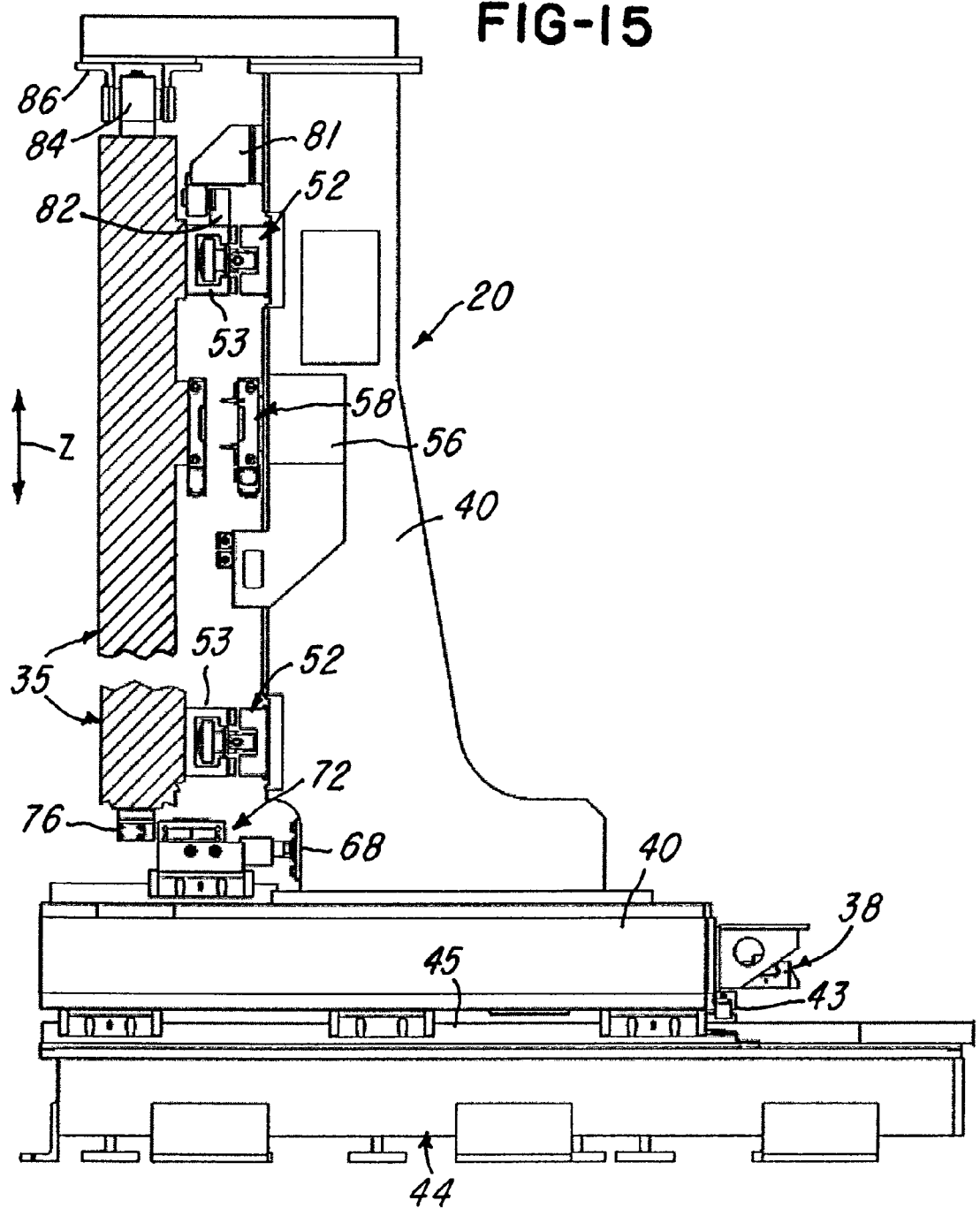
FIG. 15 is a side elevation view of the setter and its support base in a gate receiving position.
Figure 21:
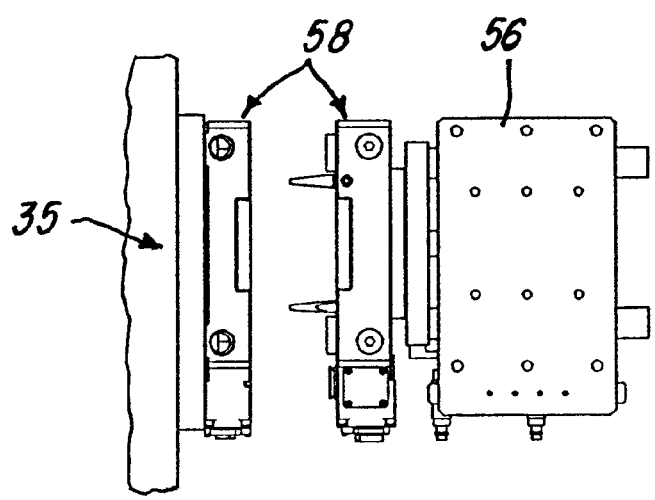
FIG. 21 is a plan view of a commercially available fluid actuated docking device for connecting electrical and fluid supply lines on the setter to a framing gate.
Figure 24:
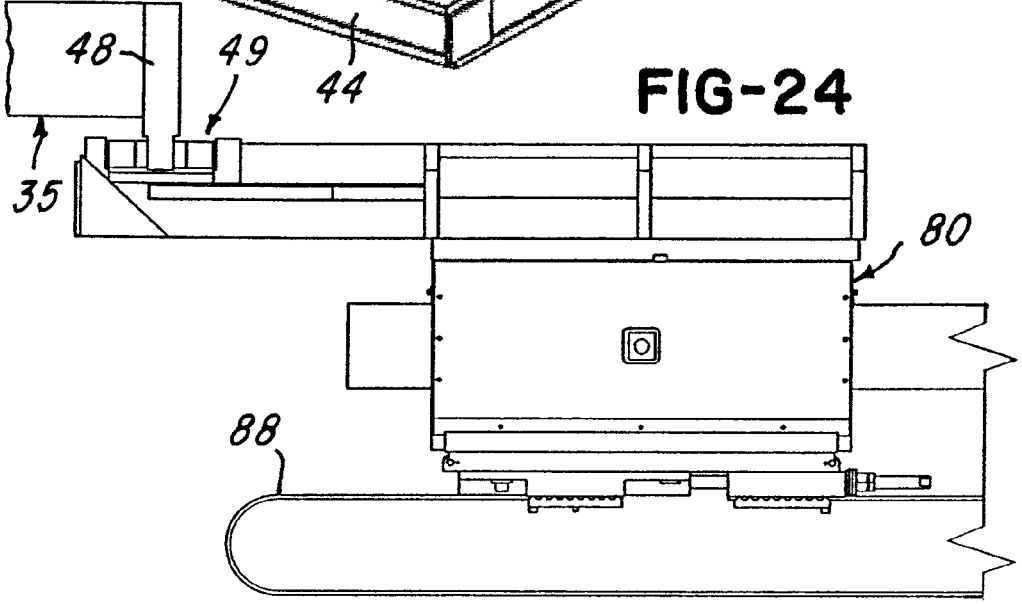
FIG. 24 is an elevation view of a storage belt carriage and hitch system for moving a gate to and from a gate storage belt shuttle.
Figure 25:
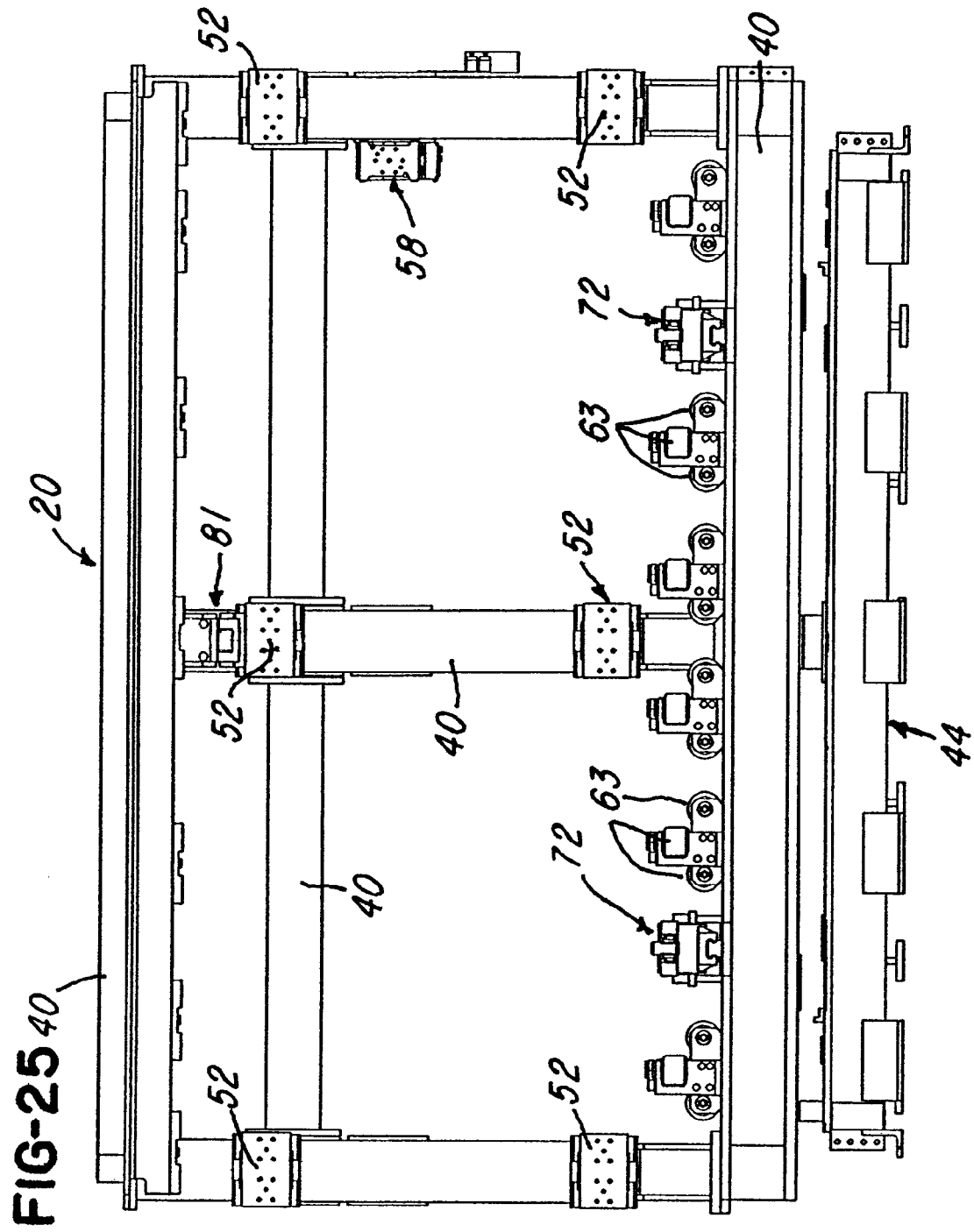
FIG. 25 is a front elevation view of the setter frame and showing the roller support and guide system for a gate, gate registration devices, line docking devices and pull back clamping cylinder.

As the setter 20 moves into alignment with a row of two opposing gate storage belt shuttles 30, a drive dog 48 (FIG. 24) mounted on each end of the gate 35 carried by the setter 20, engages a carriage hitch device 49 connected to one of the gate storage belt shuttles 30. When the gate 35 on the setter is in alignment with the shuttle 30, the cross car locator roller clusters 38 (FIG. 17) are actuated by the corresponding cylinders 42 and engage locators 43 at the gate change position (FIG. 6). Then six fluid cylinder actuated devices 52 (FIGS. 15 & 25) on the setter frame 40 release corresponding "C" channel sections 53 on the gate 35 to be exchanged with one in storage on a belt shuttle. This includes a release of an air cylinder (not shown) that controls engaging and disengaging of electrical and air utility lines through a commercially available docking device 58 (FIGS. 15, 21 & 25) supported for linear movement by guide rod support blocks 56 (FIG. 15).

Figure 19:
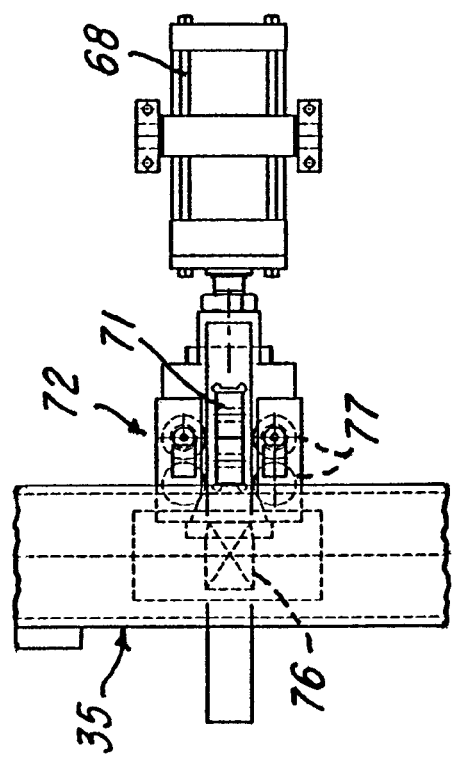
FIG. 19 is a plan view of the gate registering system shown in FIG. 18.
Figure 22:
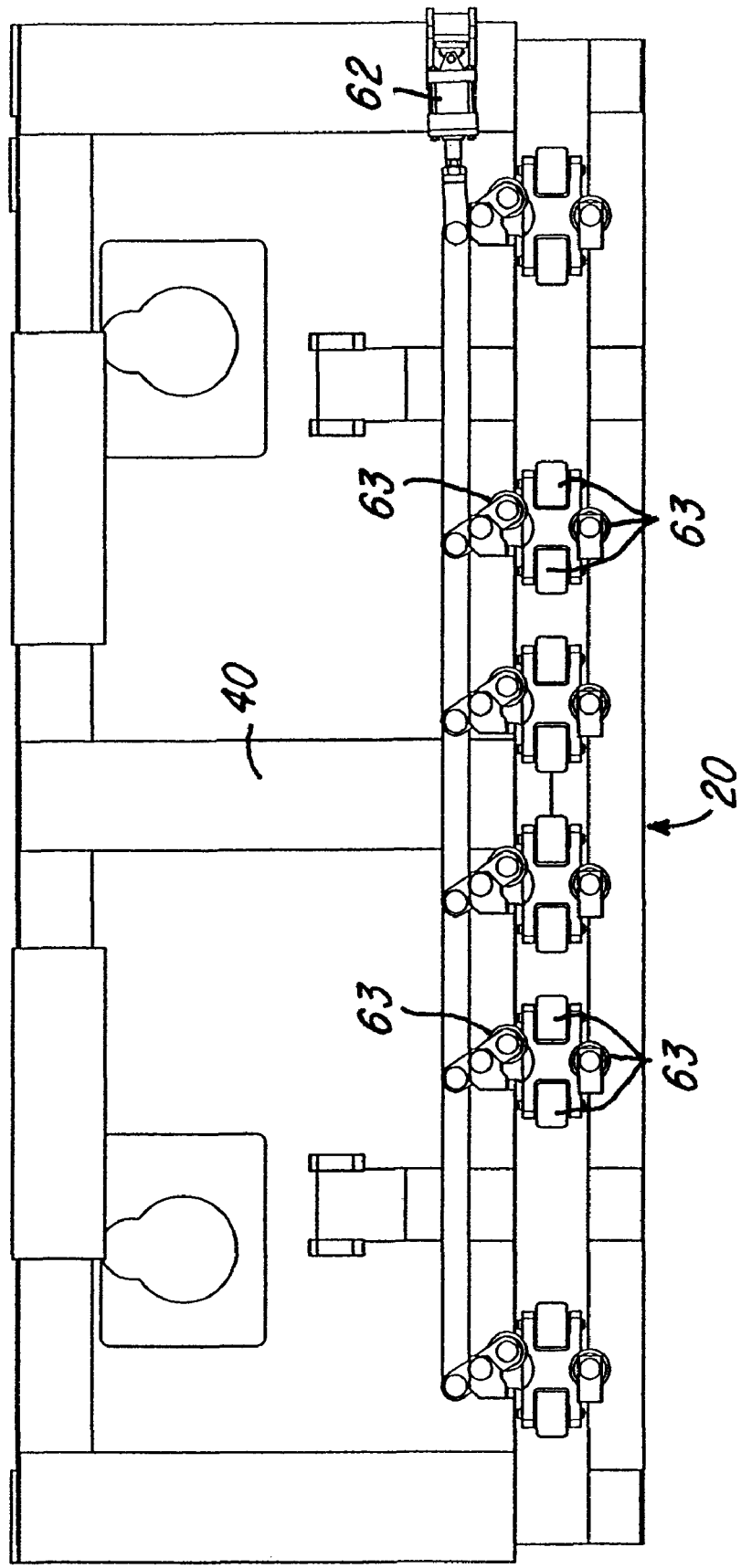
FIG. 22 is a plan view of the setter and showing a fluid actuated resilient roller system for guiding a gate onto the setter.
Figure 23:
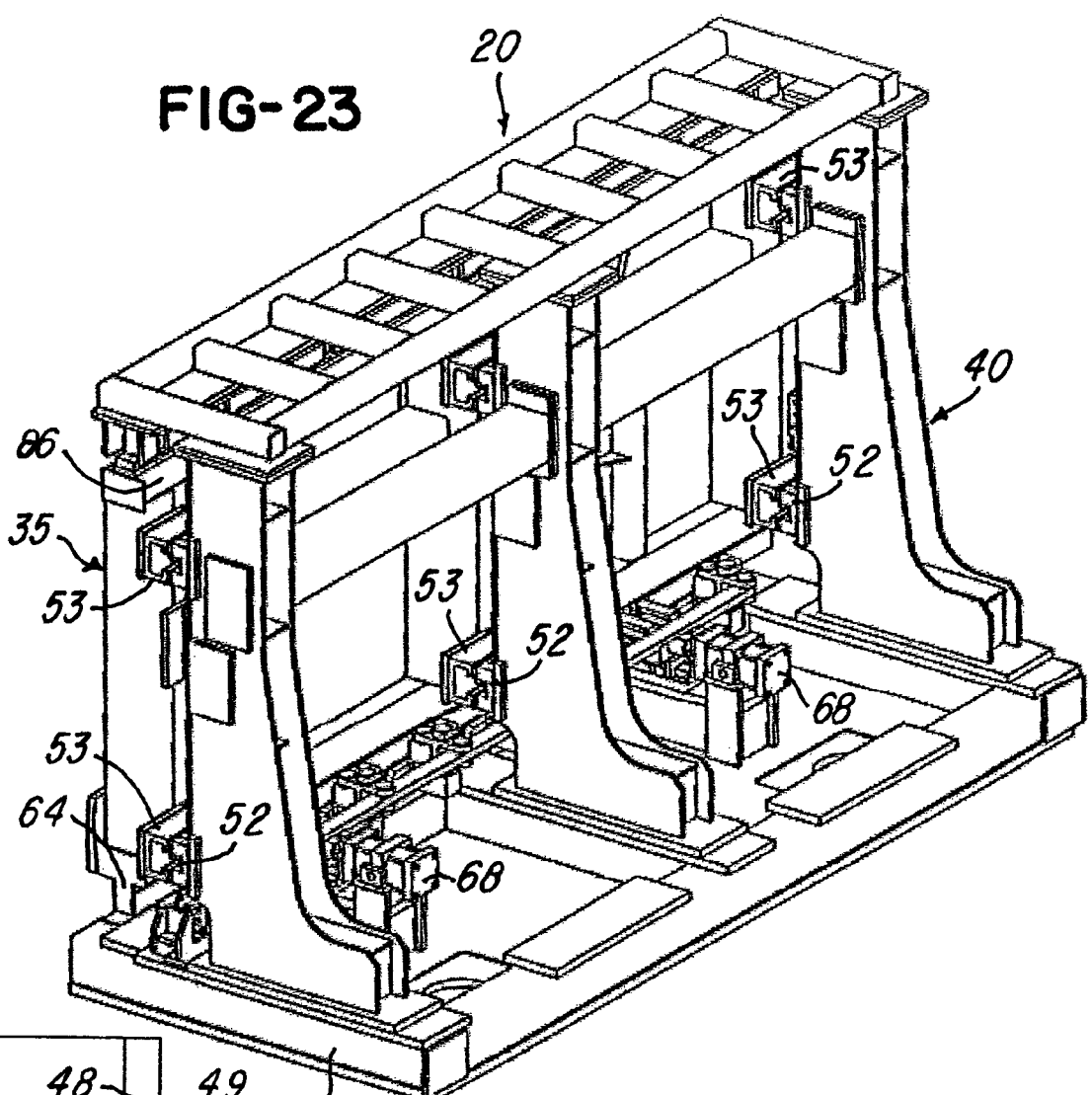
FIG. 23 is a rear perspective view of the setter and also showing the fluid actuated roller system for supporting and receiving a framing gate as the gate moves onto the setter.
Figure 26:
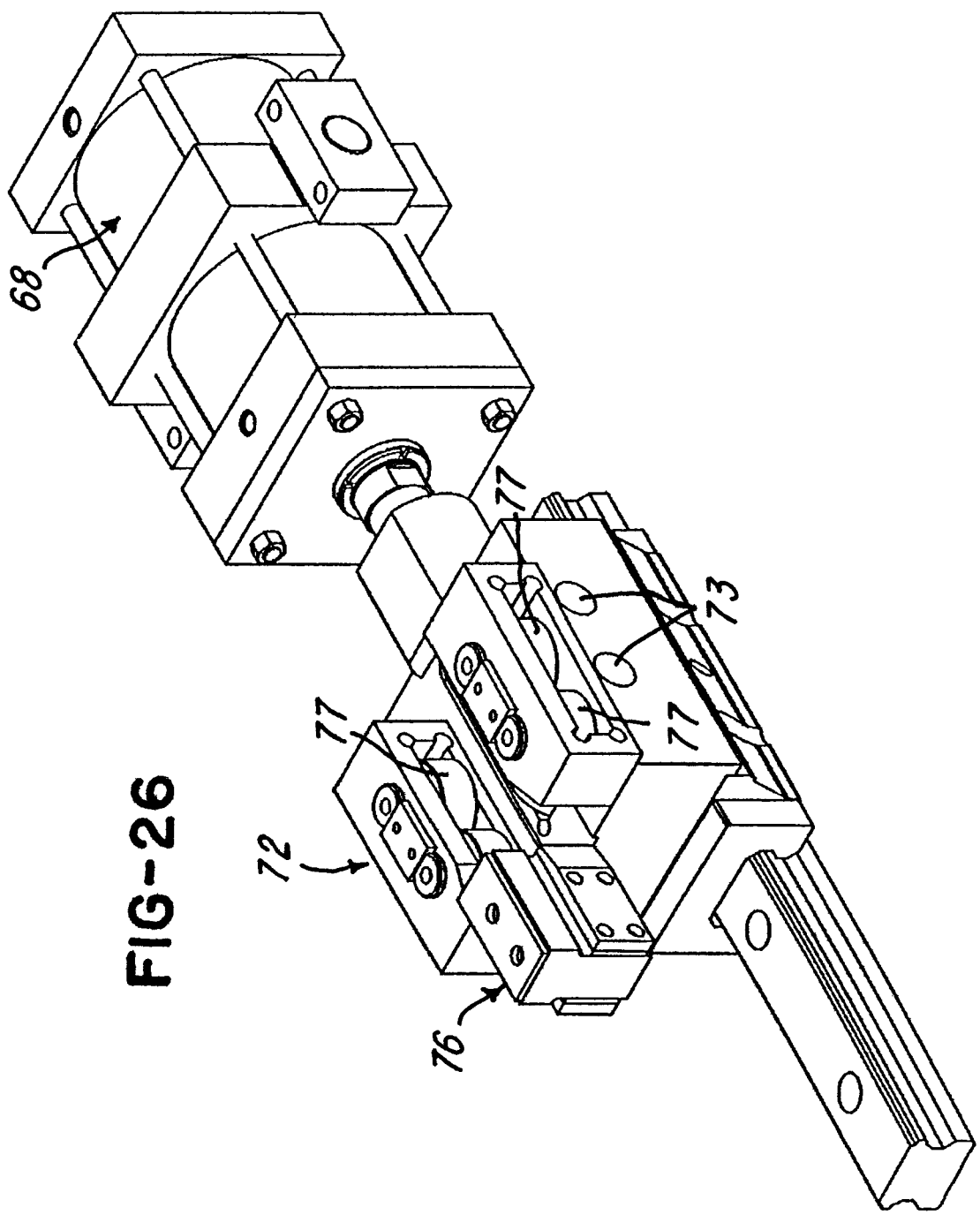
FIG. 26 is a perspective view of one of the two devices mounted on the setter frame shown in FIGS. 18 & 25 for registering a gate on the setter with respect to the horizontal X axis and vertical Z axis.

Also released is a fluid cylinder 62 (FIG. 22) which actuates a set of retractable resilient urethane guide rollers 63 that cooperate with fixed resilient urethane guide rollers 63 to confine a segmented guide rail 64 (FIG. 23) on the bottom of the gate 35. A pair of fluid cylinders 68 (FIGS. 15 & 26) move a pair of slide blocks and roller assemblies 72 perpendicular to the gate and on the Y axis within spaces between segments of the guide rail 64. The roller assemblies 72 include a pair of rollers 71 (FIG. 19) having horizontal axes supported by shafts 73 for engaging and disengaging locator blocks 76 mounted on the bottom of the gate. The blocks 76 have shim plates to register the gate up/down precisely on the Z axis (FIG. 15), and one of the assemblies 72 has rollers 77 with vertical axes to register the gate 35 precisely on the X axis with respect to the setter 20.

After a gate is fully released from the setter frame 40, a servo controlled drive unit 78 (FIG. 6) on an empty belt shuttle 30 is actuated so that the gate 35 on the setter 20 is engaged by the hitch device 49 mounted on a carriage 80 (FIG. 24) secured to a flexible belt 88. The hitch and carriage on the belt shuttle pull the gate 35 off the setter 20 onto resilient urethane roller clusters 63 (FIG. 6) mounted on the frame of the belt shuttle 30 and in a direction parallel to the X axis of the assembly line. The rapid movement of the belt shuttle carriage 80 continues until the gate being removed is fully clear and stored on a belt shuttle 30. Preferably, each high speed belt shuttle 30 is constructed as disclosed in applicant's U.S. Pat. No. 6,223,611, now owned by the assignee of the present invention, and the disclosure of which is herein incorporated by reference.

At the same time that one belt shuttle 30 is removing a gate 35 from the setter 20, the opposite side or opposing storage belt shuttle 30 is pushing the next gate 35 that has been called for onto the setter 20. As the gate 35 being loaded onto the setter 20 is approaching its final loaded location, a pull back roller 81 (FIGS. 15 & 25) located on the top center of the setter 20 engages a cam follower or shoe 82 on the gate, and the shoe pulls the top of the gate 35 toward the setter to release or disengage resilient urethane guide rollers 84 (FIG. 25) mounted on the top of the gate from a downwardly facing guide channel 86 supported by a head portion of the setter frame 40.

This allows the pair of rollers with horizontal axes on the roller locators 72 (FIGS. 15 & 26) to move forwardly on the setter base 44 to engage the corresponding blocks 76 on the bottom of the gate to lift the gate (Z axis) into a precision vertical registry position without resistance from the rollers 84 on the gate within the guide channel 86. That is, after the belt shuttle 30 loading a gate 35 onto the setter 20 has the gate in a general location on the setter, the fluid powered cylinders 68 (FIG. 26) on the setter are actuated to register the gate precisely on an X axis, a Y axis and a Z axis with respect to the setter frame 40. When registered, the setter locator roller clusters 38 (FIG. 17) are retracted, and the setter 20 is moved forward to the framing position (FIGS. 1-4) by about 3,700 mm. If the next gate 35 required is the one that has just been removed from the setter 20, then the above steps are reversed.

If the framing station requires three different gate framing tools, then the gate staging cart 25 (FIG. 2) is provided on each side of the framing line to handle a third gate on each side. The gate staging cart 25 is constructed similar to the setter 20 and is positioned behind the setter 20 far enough away from the framing line to allow the setter 20 to move into alignment with the first row of belt storage shuttles 30 and not interfere with a gate 35 in storage on the staging cart 25. The cart 25 is moved on parallel spaced tracks or rails 45 by rack and pinion drive units 46 (FIGS. 2 & 20) to a position (FIG. 9) aligned with the first row of opposing belt storage shuttles 30.

When the staging cart 25 moves toward the framing line and into alignment with the two opposing belt storage shuttles 30, the hitch 49 on an empty gate shuttle engages the drive dog 48 on the gate 35 on the staging cart 25. After alignment has been accomplished, a locking cylinder on the staging cart is released, and the drives 78 for both belt storage shuttles 30 on opposite ends of the cart 25 are actuated. The gate 35 on the staging cart 25 is pulled onto the empty belt shuttle, and the gate 35 on the opposing belt shuttle 30 is pushed onto the staging cart 25. After the transfers of the gates are completed, a locking cylinder on a pull back device on the staging cart 25 is engaged to lock the gate 35 on the staging staging cart 25. Then the staging cart 25 moves away (Y axis) from the transfer line into its back position (FIG. 2) to provide room for the setter 20 to move back and align with the first row of opposing belt storage shuttles 30.

If the framing station requires four different gate framing tools (FIG. 3), then two more laterally aligned and opposing gate storage belt shuttles 30 are provided on each side of the framing line to allow the system to handle a fourth set of gates 35. The addition of the two shuttles 30 provides a storage location and an empty location (FIGS. 7-14) in the system such that a fourth gate 35 can be circulated or shuttled through the system, as illustrated by gates 35A, 35B, 35C and 35D in FIGS. 7-14.

The gate staging cart 25 is always positioned behind the setter 30 and further away from the transfer line. The staging cart 25 moves between the two rows of gate storage belt shuttles 30 to move the various style framing gates 35A-35D into or out of storage positions on the four belt shuttles 30. Should more variations of gates be required, then additional rows of gate storage shuttles 30 can be added. If this is done, the base support rails 45 and racks 47 for the staging cart 25 and for the setter are extended to provide the additional travel required to access the back rows of the belt shuttles 30.

Figure 7:
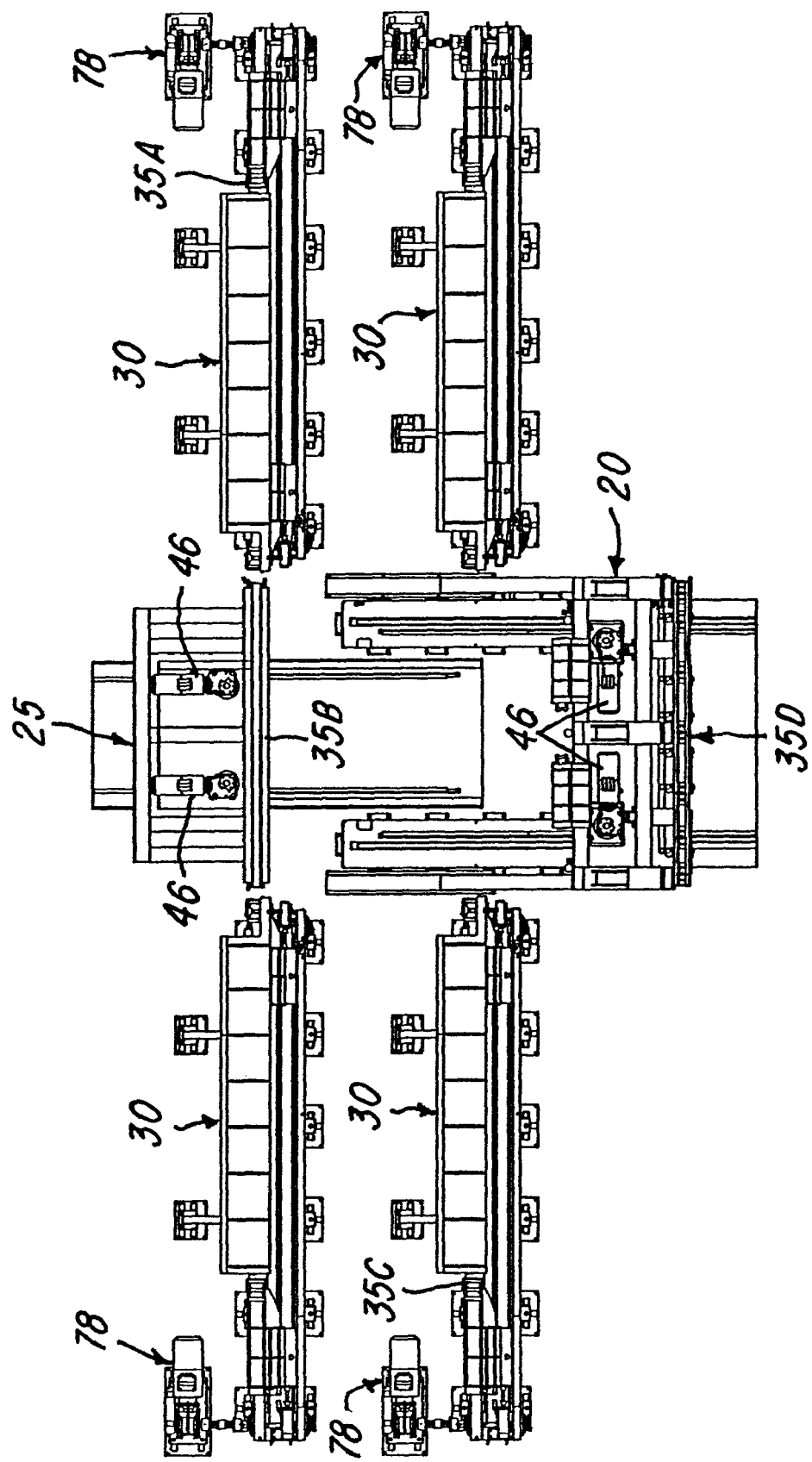
FIGS. 7-14 illustrate in plan views the seven positions of the four gate arrangement from the standby position shown in FIG. 7.
Figure 8:
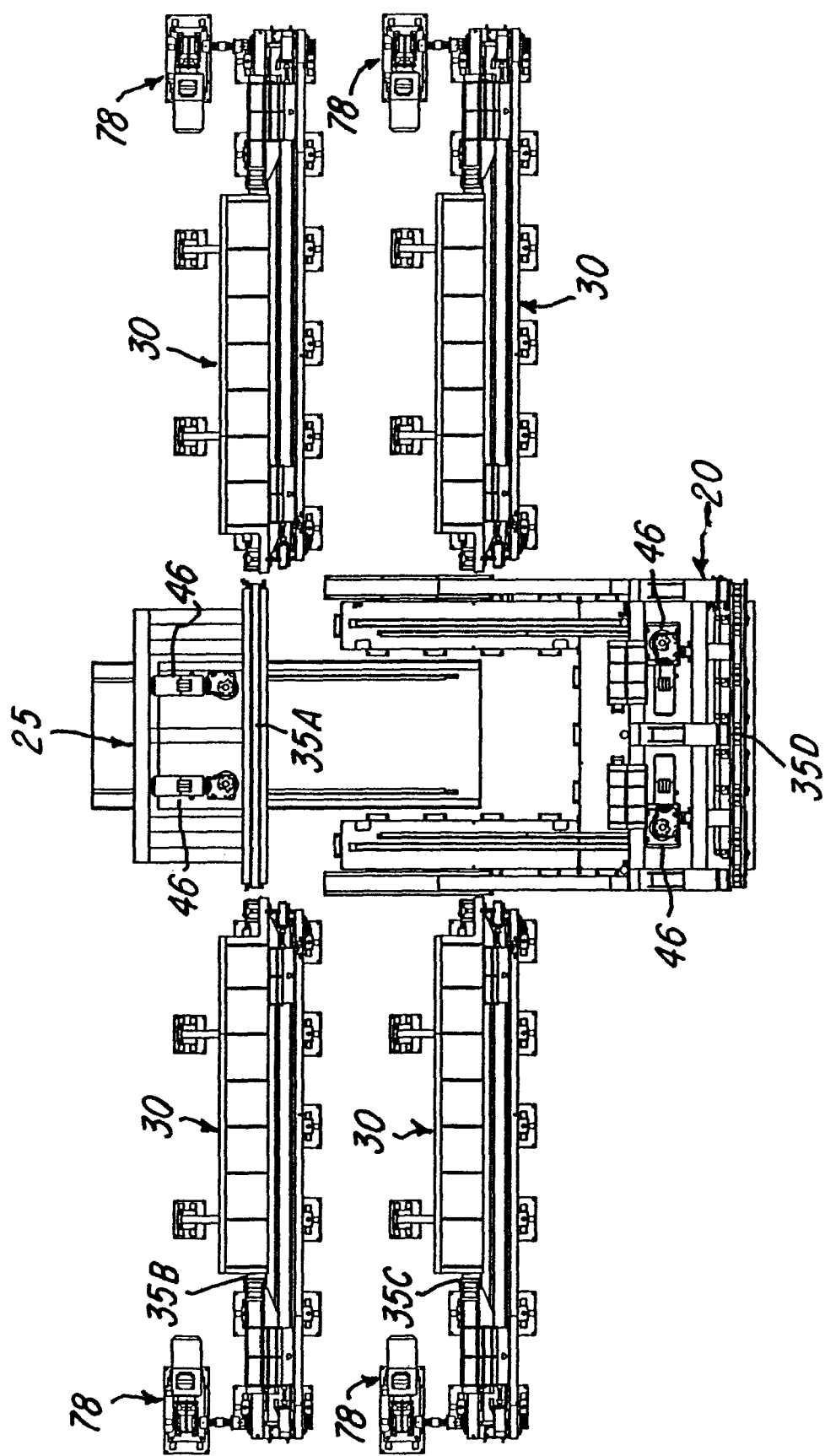
Figure 9:
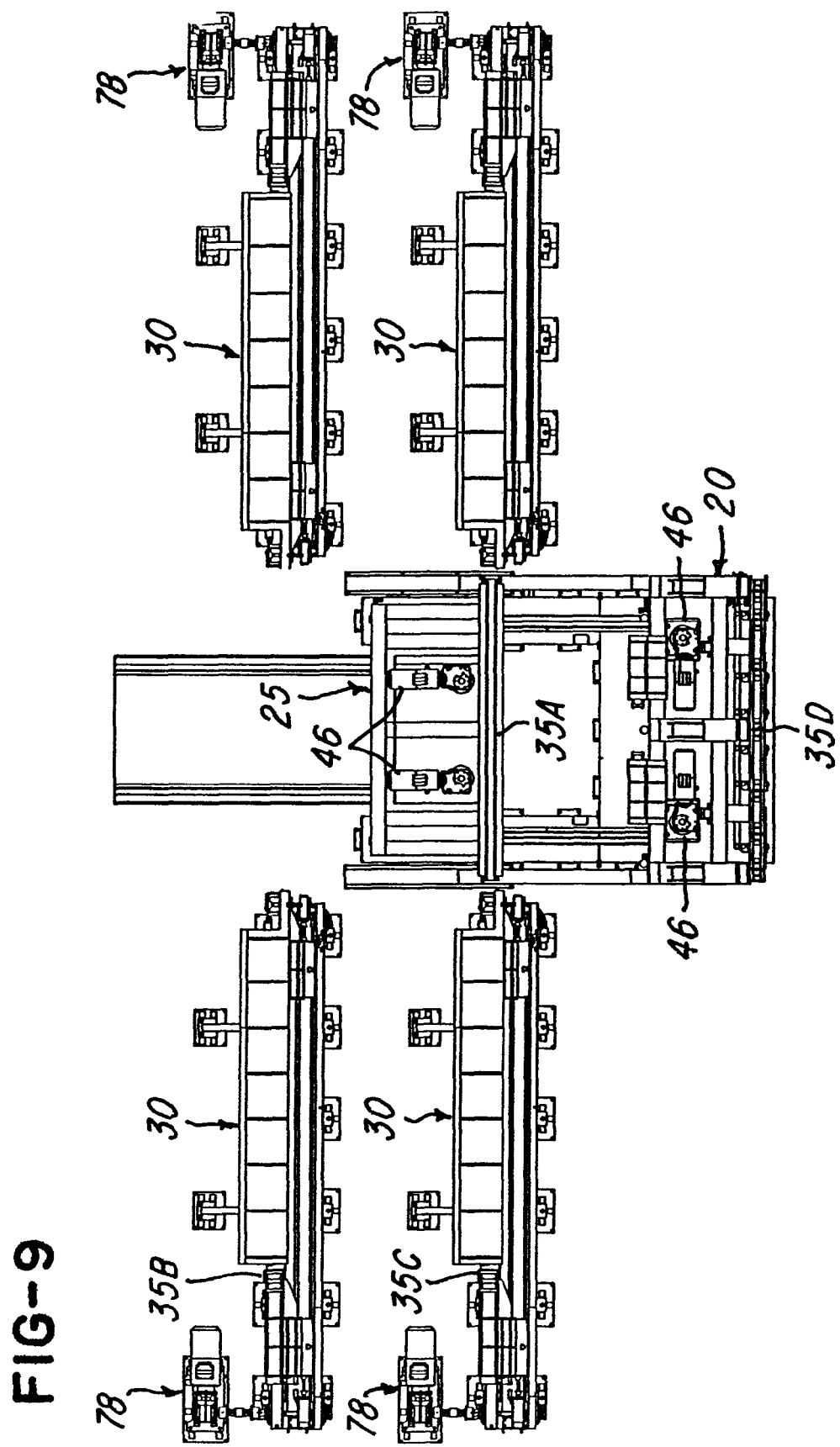
Figure 10:
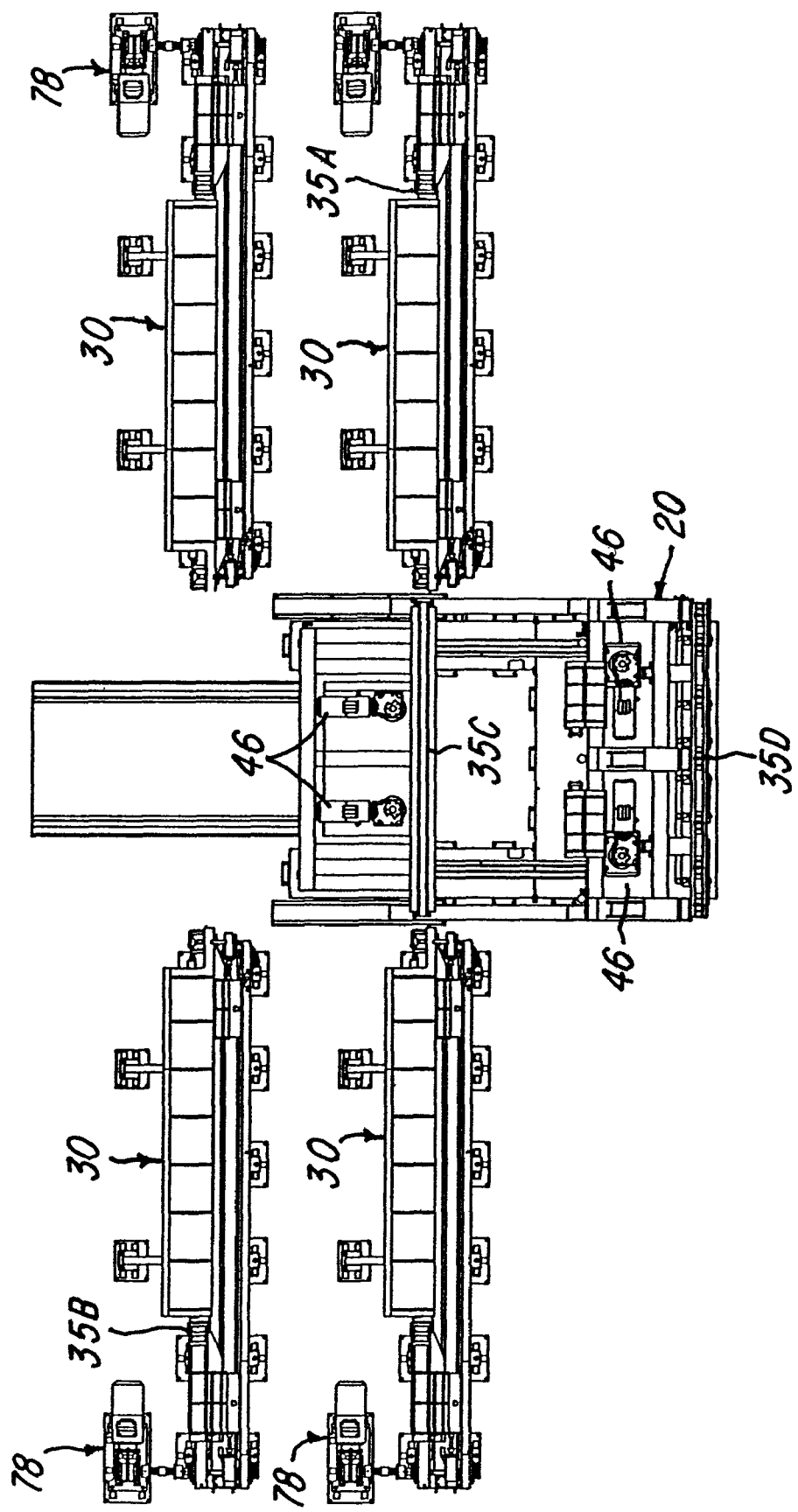
Figure 11:
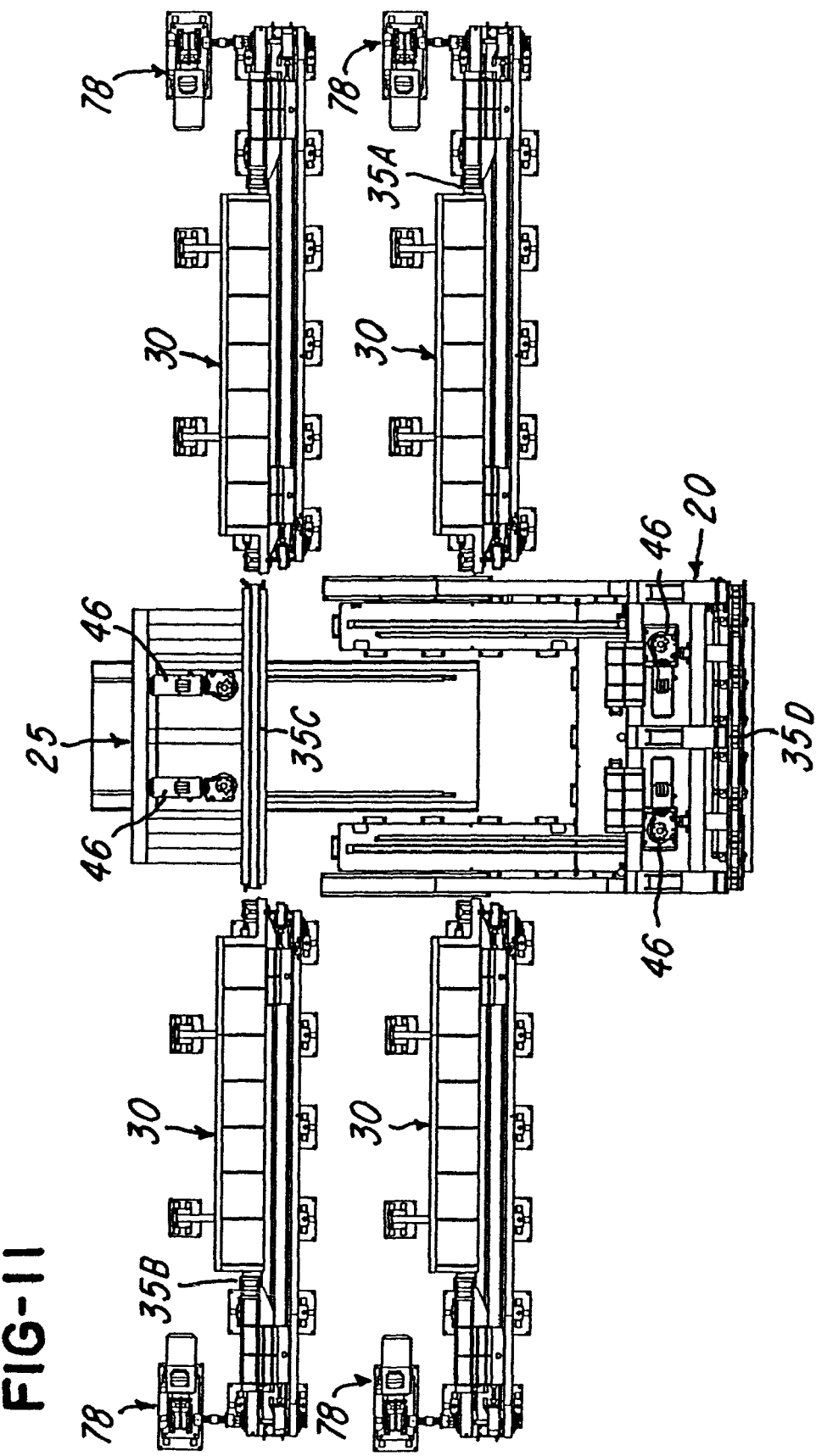
Figure 12:
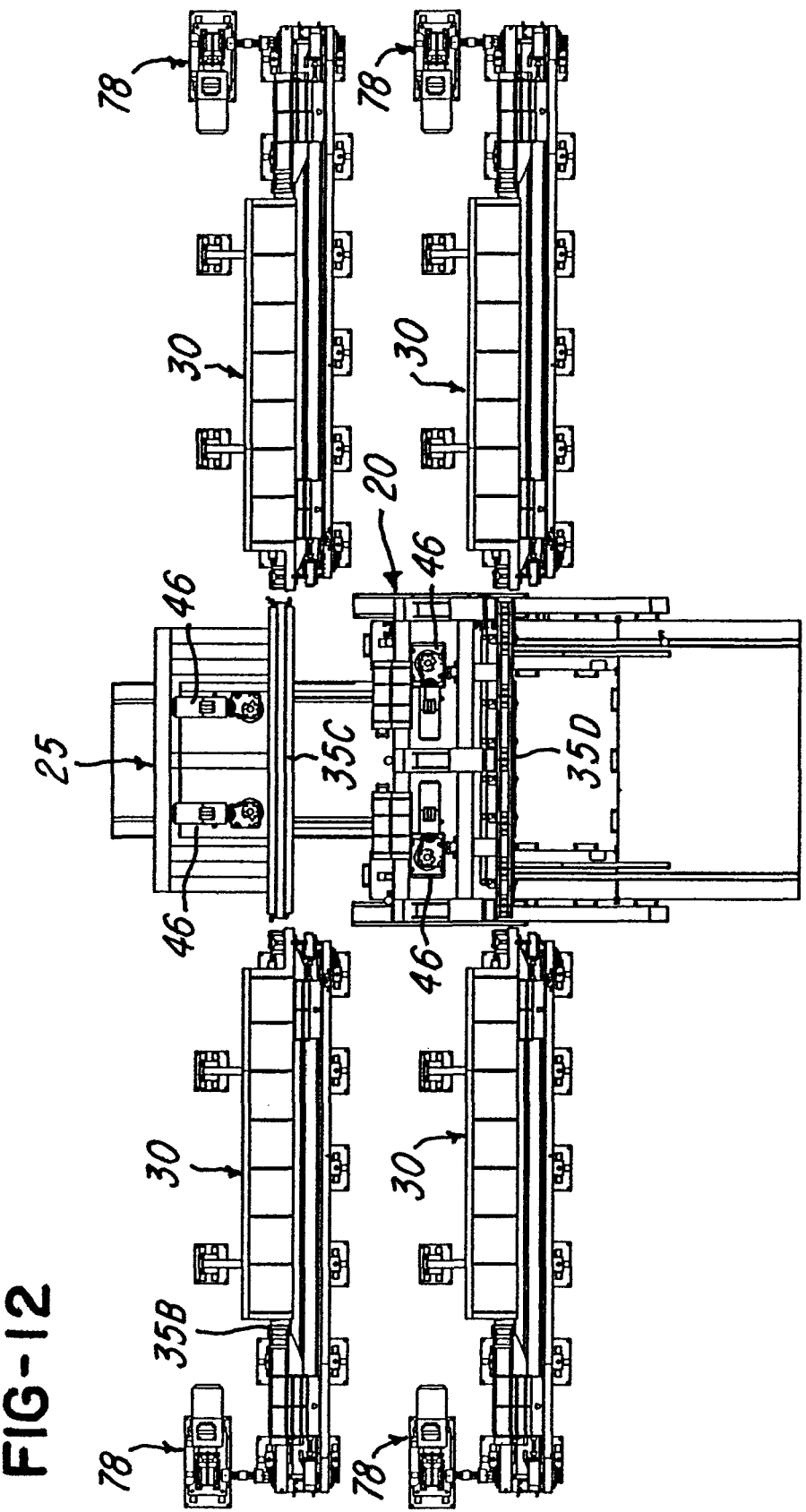
Figure 13:
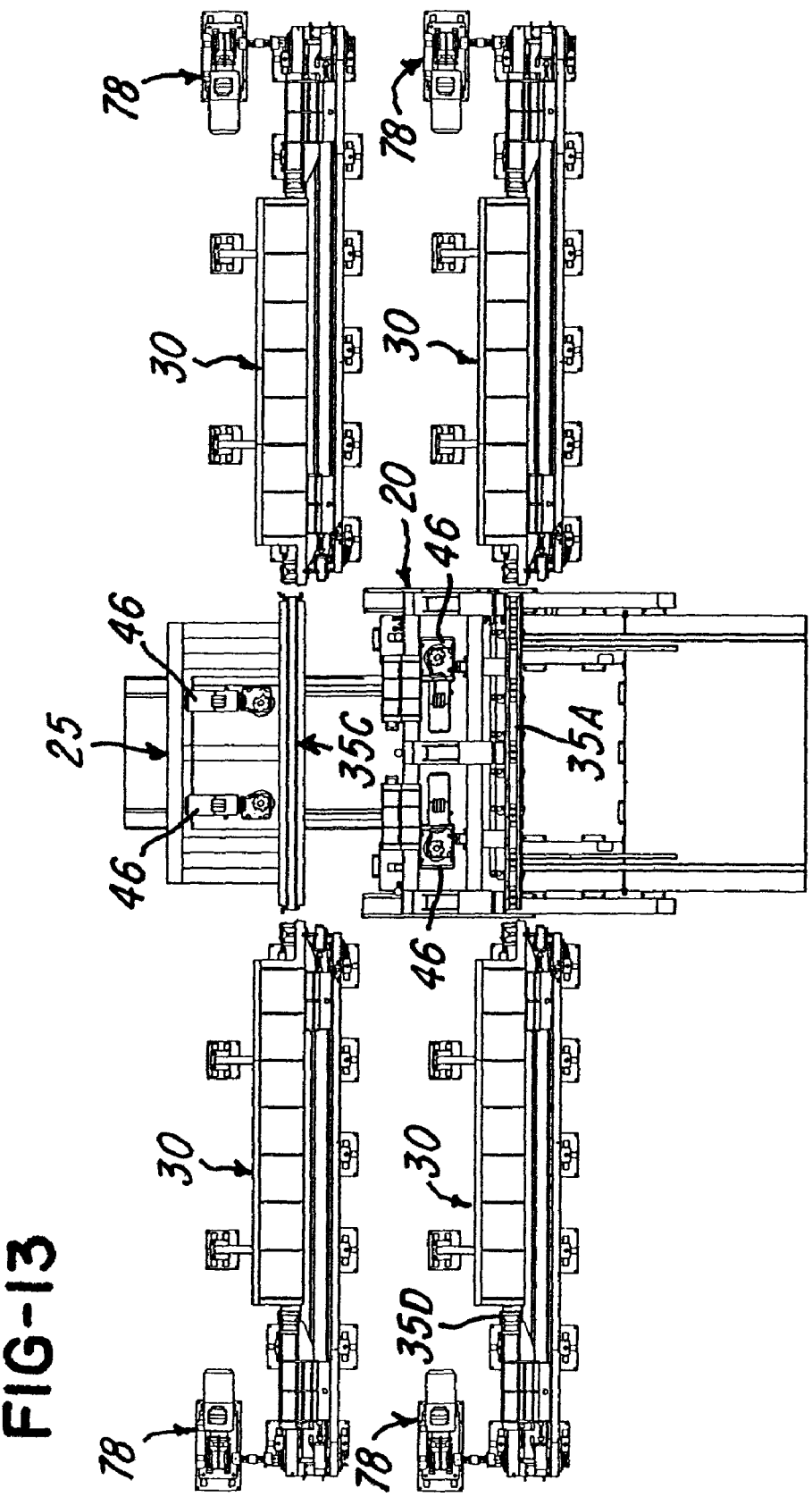
Figure 14:
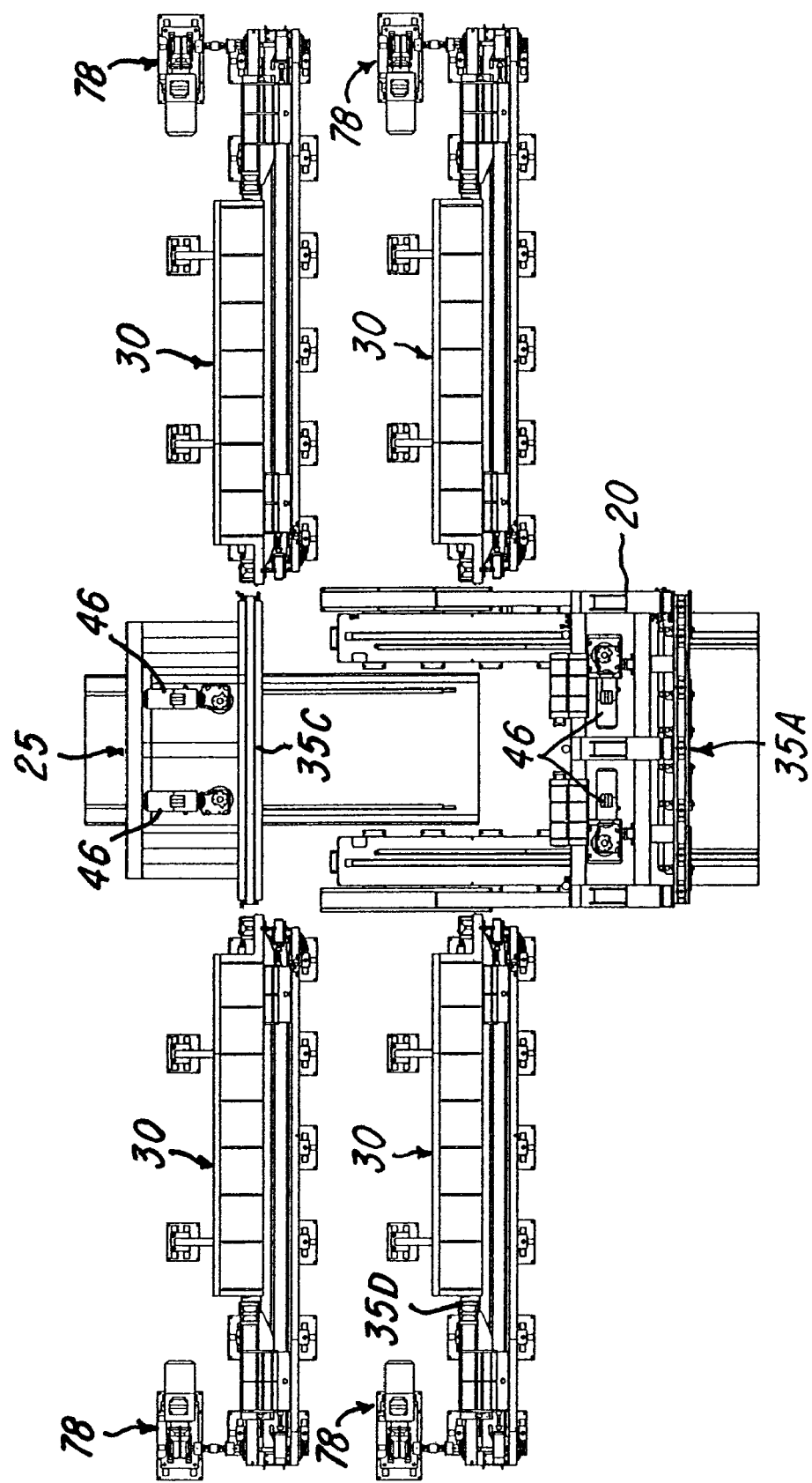

In FIG. 7, the setter 20 is in the standby position supporting gate 35D. In FIG. 8, the setter 20 indexes to the work position with gate 35D, and a shuttle 30 retrieves gate 35B from the staging cart 25 while an opposing shuttle 30 transfers gate 35A to the staging cart 25. In FIG. 9, the staging cart 25 indexes gate 35A to the staging lane between the first row of shuttles 30. In FIG. 10, a shuttle 30 retrieves gate 35A from the staging cart 25, and an opposing shuttle 30 transfers gate 35C to the staging cart. In FIG. 11, the staging cart 25 indexes gate 35C to the storage lane, and in FIG. 12, the setter 20 indexes the gate 35D to a gate exchange position. In FIG. 13, a shuttle 30 retrieves gate 35D from the setter 20, and an opposing shuttle 30 transfers gate 35A to the setter 20. In FIG. 14, the setter 20 returns to the standby position with gate 35A.

By combining the setter 20 and the cart 25, each movable on the Y axis by their own synchronized rack and pinion drive units 46, with two or more high speed gate storage belt shuttles 30, a gate 35 may be quickly changed in a short time period, for example, 14 seconds. The quick retraction or Y axis movement of the setter 20 with the rack and pinion drive units 46 also permits the first row of laterally aligned opposing shuttles 30 to be located back from the framing line by a substantial distance in order to provide increased space on opposite sides of the setter 20 for locating robotic welding equipment. The cart 25 also provides for limiting the travel of the setter 20 from the framing line to only the first row of laterally aligned opposing shuttles 30.

From the drawings of the above description, it is apparent that a motor vehicle or automotive body framing gate changing system constructed in accordance with the invention, provides desirable features and advantages. For example, the modular construction of the system provides for efficiently handling from one to six gates with a high speed change of gates within 30 seconds and close to 15 seconds. This high speed gate change is desirable in order to obtain high speed transfer of car bodies on the assembly line and to minimize down time of the robotic welding equipment. The three positions of the setter from the work position to the standby position and to the gate exchange position is also highly desirable for rapid gate exchange, and the rapid movement of the setter and staging cart on the parallel spaced linear tracks or rails with the synchronized rack and pinion drive units also contributes to the high speed gate exchange along with the opposing sets of high speed gate storage belt shuttles.

When three or more gates are required for the different style car bodies moving into the framing area, the staging cart and its operation further contributes to the rapid exchange of the three or more gates, for example, by operation of the system as described above in connection with FIGS. 7-14. The retraction of the setter to a standby position also removes the gate from the work station and provides space on opposite ends of the setter for robotic welding equipment to perform respotting operations. As another advantage, the resilient urethane rollers for guiding and supporting upper and lower portions of the gates on the setter, staging cart and the gate storage belt shuttles during movement of the gates provides for quiet operation of the framing gate changing system, which is also desirable in a car body production line.

While the form of apparatus herein described and its method of operation constitutes a preferred embodiment of the invention, it is to be understood that the invention is not limited to the precise form of apparatus and method described, and that changes may be made therein without departing from the scope and spirit of the invention as defined in the appended claims.

What is claimed is:

1. An automotive body framing system adapted for use on each side of a framing line where body components are transferred to be welded together at a framing station, said system comprising
   a setter supported for linear movement generally perpendicular to the framing line and supporting a framing gate in a work position, an elongated rack and motor driven pinion drive mechanism connected to move said setter from said work position to a retracted standby position and then further to a gate changing and storing position, a set of gate storage belt shuttles positioned in opposing relation on opposite sides of said setter at said gate changing and storing position and having releasable connections to opposite end portions of said framing gate, and a belt drive unit for operating each of said belt shuttles to move said framing gate between a retracted storage position and said work position on said setter.

2. A body framing system as defined in claim 1 wherein said setter includes a series of spaced resilient guide rollers for guiding and supporting a portion of said gate as said gate is transferred onto and from said setter.

3. A body framing system as defined in claim 1 and including a set of power operated gate registration units positioned on said setter for registering said gate in precise predetermined horizontal and vertical positions on said setter after said gate is generally received in said predetermined positions.

4. A body framing system as defined in claim 1 wherein said setter defines spaces on opposite sides of said setter in said standby position for receiving respotting welding units.

5. A body framing system as defined in claim 1 and including a gate staging cart supported for linear movement in back of said setter and in a direction parallel with said movement of said setter, and a power operated drive mechanism for moving said staging cart between a retracted position and a gate transfer position between said opposing gate storage belt shuttles.

6. A body framing system as defined in claim 5 wherein said gate staging cart is supported for linear movement by parallel spaced tracks and said power operated drive mechanism includes a set of parallel elongated racks and corresponding motor driven pinions operating in synchronism.

7. A body framing system as defined in claim 5 wherein said gate staging cart includes a series of spaced resilient guide rollers for guiding and supporting a portion of said framing gate as said gate is transferred onto and from said staging cart.

8. A body framing system as defined in claim 1 wherein each of said gate storage belt shuttles includes a series of spaced resilient guide rollers for guiding and supporting a portion of said gate as said gate is transferred onto and from each of said belt shuttles.

9. An automotive body framing system adapted for use on each side of a framing line where body components are transferred to be welded together at a framing station, said system comprising a setter supported for linear movement generally perpendicular to the framing line and supporting a framing gate in a work position, a power operated drive mechanism connected to move said setter from said work position to a gate changing and storing position, a set of gate storage belt shuttles positioned in opposing relation on opposite sides of said setter at said gate changing and storing position and having releasable connections to opposite end portions of said framing gate, a belt drive unit for operating each of said gate storage and belt shuttles to move said framing gate between a retracted storage position and said work position on said setter, a gate staging cart supported for linear movement in back of said setter and in a direction parallel with said movement of said setter, and a power operated drive mechanism connected to move said staging cart between a retracted position and a gate transfer position between said opposing gate storage belt shuttles.

10. A body framing system as defined in claim 9 wherein said setter, said staging cart and each of said storage belt shuttles includes a series of spaced resilient guide rollers for guiding and supporting a portion of said gate as said gate is transferred onto and from said setter, said staging cart and said storage belt shuttles.

11. A body framing system as defined in claim 9 and including a set of power operated gate registration units positioned on said setter for registering said gate in precise predetermined horizontal and vertical positions on said setter after said gate is generally received in said predetermined positions.

12. A body framing system as defined in claim 9 wherein said setter is movable by said drive mechanism to a standby position between said work position and said gate changing and storing position, and said setter defines spaces on opposite sides of said setter in said standby position for receiving respotting welding units.

13. A body framing system as defined in claim 9 wherein said setter and said gate staging cart are each supported for linear movement by parallel spaced tracks, and each said power operated drive mechanism includes a set of parallel elongated racks and corresponding motor driven pinions engaging said racks and operated in synchronism.

14. An automotive body framing system adapted for use on each side of a framing line where body components are transferred to be welded together at a framing station, said system comprising a setter supported for linear movement by parallel spaced tracks generally perpendicular to the framing line and supporting a framing gate in a work position, a set of parallel spaced racks and corresponding motor driven pinions engaging said racks and connected to move said setter from said work position to a gate changing and storing position, a set of gate storage belt shuttles positioned in opposing relation on opposite sides of said setter at said gate changing and storing position and having releasable connections to opposite end portions of said framing gate, and a belt drive unit for operating each of said belt shuttles to move said framing gate between a retracted storage position and said work position on said setter.

15. A body framing system as defined in claim 14 wherein said setter and each of said gate storage belt shuttles includes a series of spaced resilient guide rollers for guiding and supporting a portion of said gate as said gate is transferred onto and from said setter and onto and from each of said gate storage belt shuttles.

16. A body framing system as defined in claim 14 and including a set of power operated gate registration units positioned on said setter for registering said gate in precise predetermined horizontal and vertical positions on said setter after said gate is generally received in said predetermined positions.

17. A body framing system as defined in claim 14 wherein said setter defines spaces on opposite sides of said setter in a standby position between said work position and said gate changing and storing position for receiving respotting welding units.

18. A body framing system as defined in claim 14 and including a gate staging cart supported for linear movement by parallel spaced tracks in back of said setter and in a direction parallel with said movement of said setter, and a set of parallel elongated racks and corresponding motor driven pinions operating in synchronism for moving said staging cart between a retracted position and a gate transfer position between said opposing gate storage belt shuttles.

19. A body framing system as defined in claim 18 wherein said gate staging cart includes a series of spaced resilient guide rollers for guiding and supporting a portion of said framing gate as said gate is transferred onto and from said staging cart.

20. A body framing system as defined in claim 14 wherein each of said gate storage belt shuttles includes a series of spaced resilient guide rollers for guiding and supporting a portion of said gate as said gate is transferred onto and from each of said belt shuttles.

\* \* \* \* \*